US008755773B2

(12) United States Patent
Goel et al.

(10) Patent No.: US 8,755,773 B2
(45) Date of Patent: Jun. 17, 2014

(54) SYSTEM AND METHOD OF PROVIDING NOTIFICATIONS FOR ACKNOWLEDGEMENT OF MISSED CALLS

(75) Inventors: Mudit Goel, Karnataka (IN); Satish Kanugovi, Karnataka (IN); Sarang Gadgil, Karnataka (IN); Nagendra Bykampadi, Karnataka (IN); Shivani Arora, Karnataka (IN)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/201,582

(22) PCT Filed: Feb. 16, 2009

(86) PCT No.: PCT/IB2009/052311
§ 371 (c)(1),
(2), (4) Date: Oct. 24, 2011

(87) PCT Pub. No.: WO2010/092439
PCT Pub. Date: Aug. 19, 2010

(65) Prior Publication Data
US 2012/0028618 A1    Feb. 2, 2012

(51) Int. Cl.
*H04W 4/12*    (2009.01)
(52) U.S. Cl.
USPC .............. 455/414.1; 455/414.2; 455/566; 455/418; 379/88.12; 379/133
(58) Field of Classification Search
CPC .................................................. H04W 36/385
USPC .................. 455/414.1, 566, 415, 414.2, 418; 379/88.12, 133; 340/7.43
See application file for complete search history.

(56) References Cited

U.S. PATENT DOCUMENTS

| 5,629,982 | A  | * | 5/1997  | Micali ............................ 380/30 |
| 5,956,390 | A  |   | 9/1999  | McKibben et al. |
| 6,323,754 | B1 | * | 11/2001 | Simons ........................ 340/7.43 |
| 6,529,737 | B1 |   | 3/2003  | Skinner et al. |
| 6,678,361 | B2 | * | 1/2004  | Rooke et al. ............... 379/93.24 |
| 7,493,110 | B2 | * | 2/2009  | Jiang ............................ 455/418 |

(Continued)

FOREIGN PATENT DOCUMENTS

| EP | 1 259 036 A1 | 11/2002 |
| FR | 2 768 007 A | 3/1999 |
| WO | WO 01/28171 A1 | 4/2001 |
| WO | WO 03/085999 A1 | 10/2003 |

OTHER PUBLICATIONS

International Search Report for PCT/IB2009/052311 dated Nov. 27, 2009.

*Primary Examiner* — Charles Shedrick
(74) *Attorney, Agent, or Firm* — Fay Sharpe LLP

(57) ABSTRACT

A system and method for notifying the calling party of acknowledgment of the missed calls by the called party is disclosed. The called party and the calling party can subscribe for the notification service to enable charging for the service. When the calling party initiates a call to the called party it may result in a missed call as the called party may be out of coverage area or busy. When the called party views the record of the missed call a notification is generated on the wireless device by the application on the wireless device of the called party. The notification is then sent to the calling party. The acknowledgement notification may be sent directly to the calling party or via an application server.

20 Claims, 22 Drawing Sheets

(56) References Cited

U.S. PATENT DOCUMENTS

| | | | |
|---|---|---|---|
| 7,949,328 B2* | 5/2011 | Jiang | 455/412.1 |
| 8,036,643 B2* | 10/2011 | Murri et al. | 455/412.2 |
| 8,126,120 B2* | 2/2012 | Stifelman et al. | 379/88.12 |
| 2001/0031631 A1* | 10/2001 | Pitts | 455/411 |
| 2003/0198324 A1* | 10/2003 | Chang et al. | 379/93.23 |
| 2003/0206619 A1* | 11/2003 | Curbow et al. | 379/210.01 |
| 2004/0090951 A1* | 5/2004 | Jung | 370/352 |
| 2005/0047561 A1* | 3/2005 | Seiferth | 379/88.22 |
| 2005/0059384 A1* | 3/2005 | Kuusinen et al. | 455/414.1 |
| 2005/0124360 A1* | 6/2005 | Choi | 455/466 |
| 2005/0165897 A1 | 7/2005 | Prenzel et al. | |
| 2006/0293037 A1* | 12/2006 | Signore | 455/417 |
| 2007/0263789 A1* | 11/2007 | Palazzo | 379/67.1 |
| 2007/0275698 A1* | 11/2007 | Kuiken et al. | 455/414.1 |
| 2008/0057926 A1* | 3/2008 | Forstall et al. | 455/415 |
| 2009/0245483 A1* | 10/2009 | Shibuya et al. | 379/88.12 |
| 2009/0285166 A1* | 11/2009 | Huber et al. | 370/329 |
| 2010/0016002 A1* | 1/2010 | Konicek et al. | 455/466 |
| 2010/0111275 A1* | 5/2010 | Varma | 379/133 |
| 2011/0021182 A1* | 1/2011 | Huan | 455/414.1 |
| 2011/0270935 A1* | 11/2011 | Tozaki et al. | 709/206 |

* cited by examiner

SYSTEM AND METHOD OF PROVIDING NOTIFICATIONS FOR ACKNOWLEDGEMENT OF MISSED CALLS

BACKGROUND

1. Technical Field

The embodiments herein relate to wireless communication systems and, more particularly, to a system and method of providing notifications for acknowledgement of missed calls in wireless communication systems.

2. Description of the Related Art

Many solutions exist to provide the called party of wireless communication devices with alerts of missed call. A missed call may be a call which is not answered, a call that returns a busy tone, a call that is rejected (either by the called party intentionally or by an application in the called party mobile device) or the case wherein the wireless device is switched off or is out of the coverage area. Existing solutions notify the called party of the missed calls in the form of an SMS when the called party is in the coverage area or returns into the coverage area or mobile device is switched on. Or an alert signal in the form of a reminder may be sent to the called party. However the calling party does not receive a confirmation from the called party if the call has been received. Also there is no assurance as to whether the required action will be taken by the called party. This may leave the calling party in an ambiguous situation, whether the missed call has been viewed by the called party or not.

Wireless communication service providers provide the subscribers with facilities to register for the missed call alerts. When there is a missed call either because the called party is out of coverage area or is unable to attend a call an SMS is sent to the called party once he reaches an area with coverage, disclosing the details of the time of the call, id of the calling party and so on. But there is a time lag between the time when the call is missed and the time when the called party is alerted of the same. Also there are facilities to leave a voice message on the called party's phone. In other known solutions, call forwarding facilities also exist. Where the call is forwarded to a pre-stored number, in case the called party is not able to address the call, where the number is pre-stored by the called party. In addition there are systems for notifying and reminding the called party about the missed calls in a manner specified by the called party.

Another method employs a computer stored program for managing the missed calls. A server keeps track of the information of missed calls, time of call and other details. Later the called party is intimated of the missed calls. The process is cumbersome and also involves time delay.

SUMMARY

In view of the foregoing, an embodiment herein provides a system and method of providing notification of the called party acknowledging the missed call to the calling party. The method comprising of sending a notification to the calling party, when called party views missed call from calling party. Both the called party and the calling party are subscribed to the notification service. An application present on communication device of the called party prompts the called party to send a notification. The notification may be sent either on confirmation from the called party or automatically. The application can also be configured to not send notifications for missed call acknowledgements. The application on the called party device can also provide user defined notification text. The notification is sent to the calling party Further the notification may be the form of a SMS, a MMS or a WAP message, which may be pre defined by the application.

Embodiments further disclose a method of providing notification of acknowledgement of missed calls, wherein, the notification goes via application server that verifies if calling party is subscribed to the notification service. The communication device comprising of a prompting means for the device to prompt user of the communication device to send a notification to the calling party; and a sending means for the communication device to send the notification to calling party.

These and other aspects of the embodiments herein will be better appreciated and understood when considered in conjunction with the following description and the accompanying drawings.

BRIEF DESCRIPTION OF THE DRAWINGS

The embodiments herein will be better understood from the following detailed description with reference to the drawings, in which.

DETAILED DESCRIPTION OF EMBODIMENTS

Figure 1:
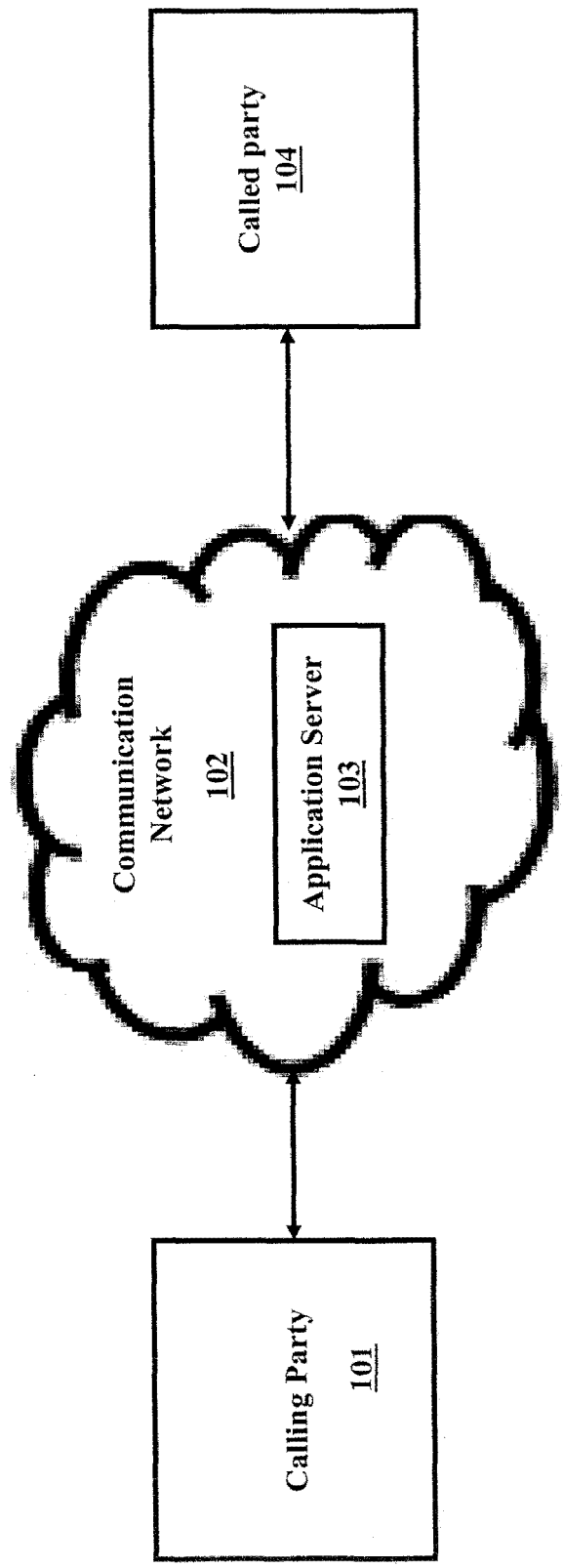
FIG. 1 is a block diagram illustrating a system for notification for acknowledgement of missed calls, in accordance with the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a system and a method of providing a notification for acknowledgement of a missed call to the calling party, when the called party views the missed call record. Referring now to the drawings, and more particularly to FIGS. 1 through 18, where similar reference characters denote corresponding features consistently throughout the figures, there are shown embodiments.

When the calling party initiates a call, the call may result in a missed call if the called party fails to pick up the call. A call may be a missed call if returns a busy tone, or the case wherein the wireless device is out of the coverage area or is switched off. Missed call notifications are used to remind the called party of a particular task such as giving a call back to the called party. Generally missed call alerts to the called party disclose details such as time of the call, identification number of the calling party and so on. Such notifications ensure the required action will be taken by the called party and the purpose of the call being served. When the called party views the record of missed call, a notification will be sent to the calling party. The notification may be in the form of a Short Service Message (SMS), Multimedia Messaging Service (MMS), Wireless Application Protocol (WAP) message or any other suitable means of messaging. The notification may be sent via an application server, with the address of the calling party as the final destination address or directly to the calling party. The application server confirms the subscription of the calling party. On confirmation the notification is sent to the calling party by the application server. The sending of the notification provisioned in the wireless device can be either on confirmation of the called party or automatically once the called party views the missed call record.

FIG. 1 is a block diagram illustrating a system to provide notification for acknowledgment of missed calls by the called party, in accordance with the embodiments herein. A calling party 101 initiates a call to a called party 103 through a network 102. The network 102 comprises of a single network, where the calling party 101 and the called party 104 belong to the same network. The network 102 also comprises of an application server 103. The call may be a missed call if the called party 104 fails to pick up the call. A missed call may be a call which is not answered by the called party 104, a call that returns a busy tone, or the case wherein the wireless device of the called party 104 is switched off or is out of the coverage area. When the called party 104 views the record of missed call, the wireless device 104 of the called party 104 generates a notification, which is sent to the application server 103. The wireless device can send the notification to the application server 103 on receiving a confirmation from the called party 104. The wireless device can also send the notification to the application server 103 automatically i.e. without any confirmation from the called party 104. The notification comprises of information like time the called party 104 viewing the missed call, the time the called party got the notification of the missed call, the address of the calling party 101 as the destination address and so on. The notification text may also be defined by the called party 104. The notification may be in the form of a SMS, MMS, WAP message or any other suitable means of messaging. The notification is sent to the application server 103 which checks to ensure the calling party 101 is a subscriber of the service. On confirming the subscription of the calling party 101, the application server 103 forwards the notification to the calling party 101, hereby notifying the calling party 101 of the missed call being viewed by the called party 104. For the purpose of charging for the subscription the application server number gets stored in the wireless device of the called party 104. As per the subscription model, the charges of the notification are borne by the calling party 101 who initiated the missed call. Subscription of the service by the called party 104 indicates his acceptance to send missed call acknowledgements. Subscription of the service by the calling party indicates his willingness to be charged for the notification service, if the service provider wants this to be a paid service. However, it is also possible for the called party 104 to accept the charges for the notification service.

Figure 2:
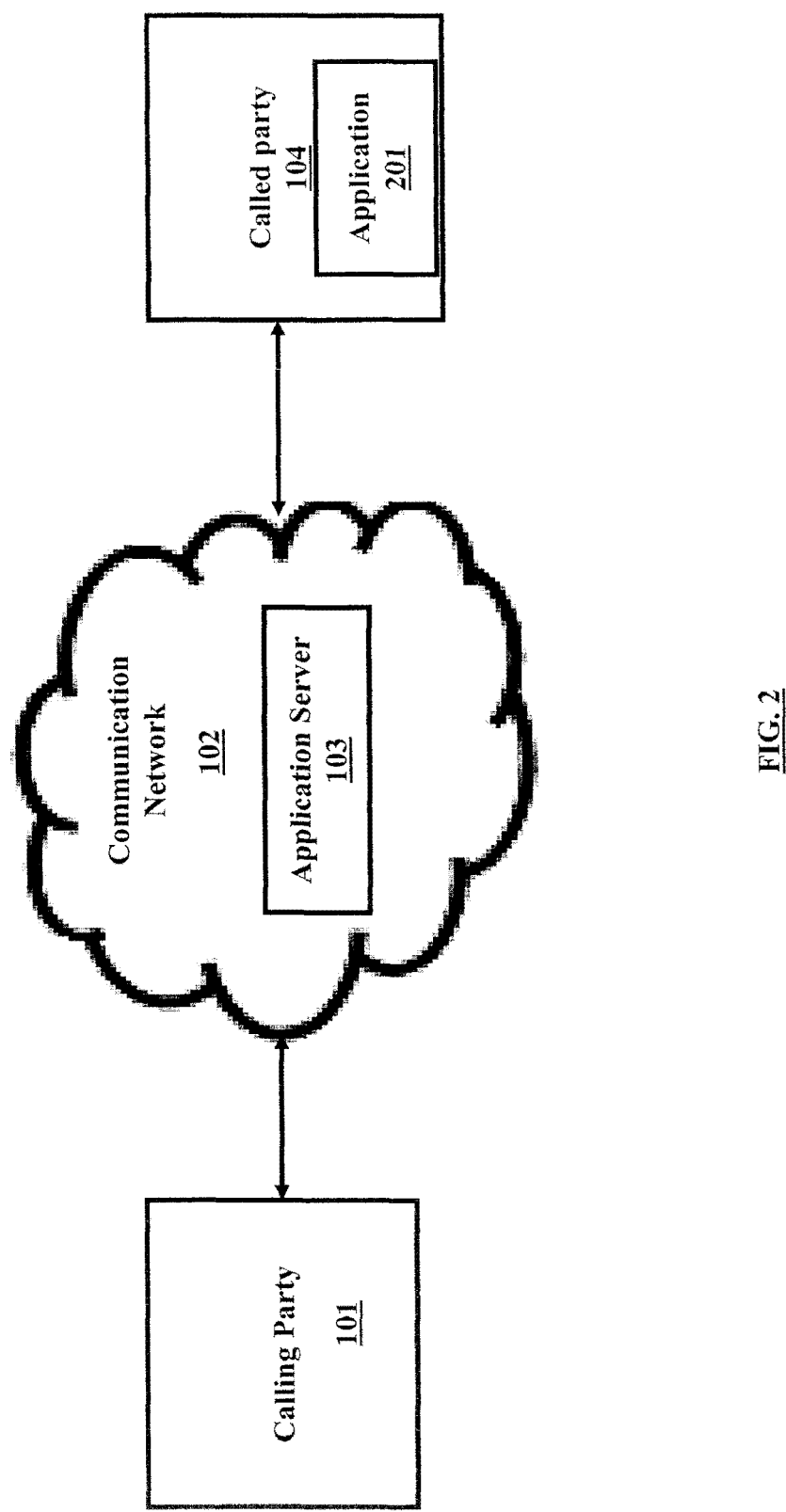
FIG. 2 is a block diagram illustrating a system for notification for acknowledgement of missed calls, in accordance with the embodiments herein.

FIG. 2 is a block diagram illustrating a system to provide notification for acknowledgment of missed calls by the called party, in accordance with the embodiments herein. A calling party 101 initiates a call to a called party 103 through a network 102. The network 102 comprises of a single network, where the calling party 101 and the called party 104 belong to the same network. The network 102 also comprises of an application server 103. The call may be a missed call if the called party 104 fails to pick up the call. A missed call may be a call which is not answered by the called party 104, a call that returns a busy tone, or the case wherein the wireless device of the called party 104 is switched off or is out of the coverage area. When the called party 104 views the record of missed call, the application 201 on the wireless device is activated. The application 201 will generate a notification the text of which can be user defined. The application 201 can send the notification to the application server 103 on receiving a confirmation from the called party 104. The application 201 can provide option of sending/not sending the notification for the missed call acknowledgement by the called party. The application 201 can also be configured so that the called party 104 is not notified before sending the acknowledgement for the missed call. This is the case where the called party has provisioned the application to send notification unsolicited upon acknowledgment of the missed call. The application 201 can be configured not to send any notification to the calling party 101. The application 201 can also provide the called party with the option of defining the text that goes as part of the notification. The notification comprises of information like time the called party 104 viewing the missed call, the address of the calling party 101 as the destination address and so on. The notification may also be defined by the called party 104. The notification may be in the form of a SMS, MMS, WAP message or any other suitable means of messaging. The notification is sent to the application server 103 which checks to ensure the calling party 101 is a subscriber of the service. On confirming the subscription of the calling party 101, the application server 103 forwards the notification to the calling party 101, hereby notifying the calling party 101 of the missed call being viewed by the called party 104. For the purpose of charging for the subscription the application server number gets stored in the wireless device the called party 104. As per the subscription model, the charges of the notification are borne by the calling party 101 who initiated the missed call. However, it is also possible for the called party 104 to accept the charges for the notification service.

Figure 3:
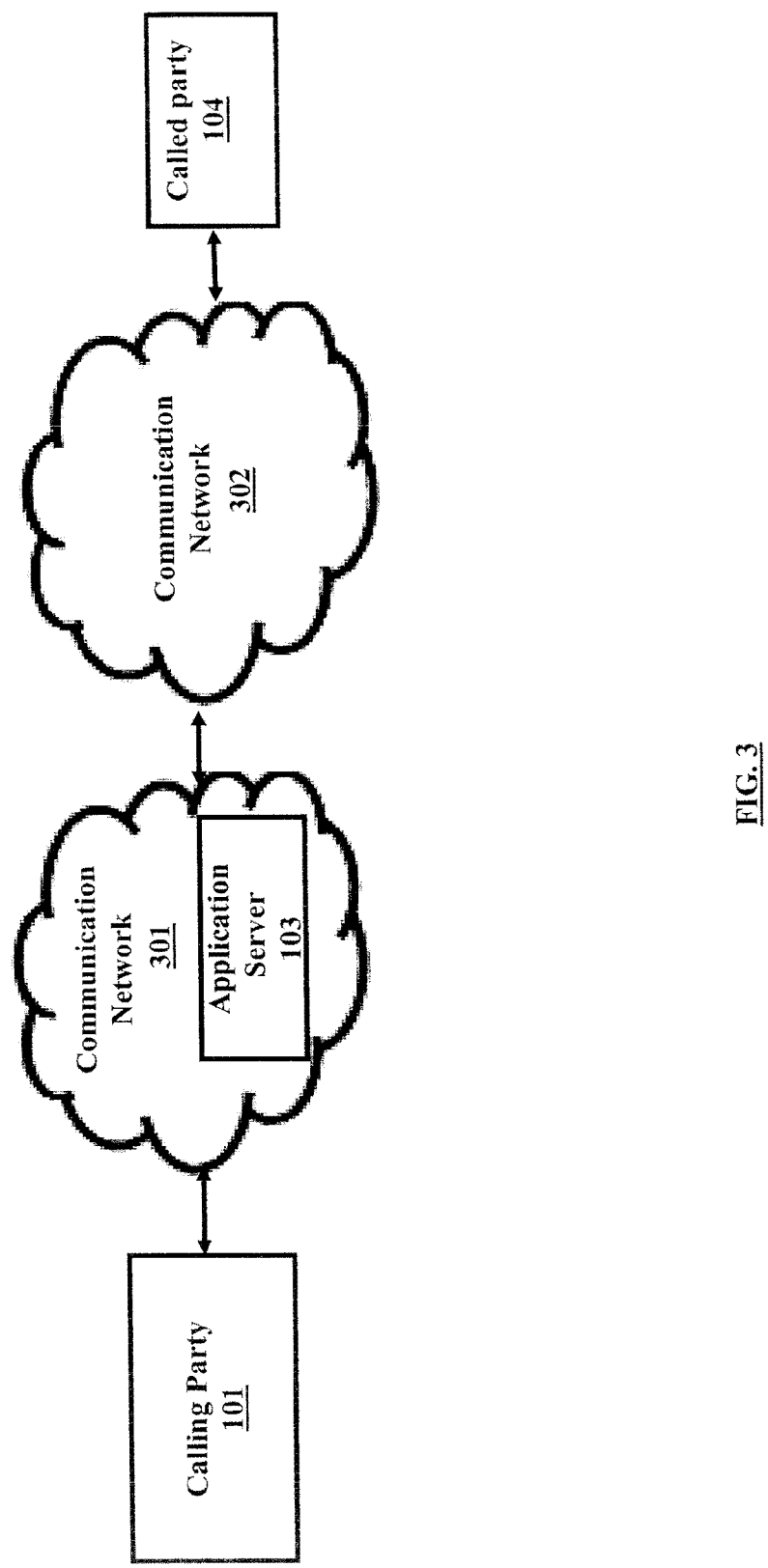
FIG. 3 is a block diagram illustrating a system for notification for acknowledgement of missed calls, in accordance with the embodiments herein.

FIG. 3 is a block diagram illustrating a system to provide notification for acknowledgment of missed calls by the called party, in accordance with the embodiments herein. A calling party 101 initiates a call to a called party 104 through networks 301 and 302, wherein the calling party 101 belongs to network 301 and the called party 104 belongs to network 302. The network 301 also comprises of an application server 103. The call may be a missed call if the called party 104 fails to pick up the call. A missed call may be a call which is not answered by the called party 104, a call that returns a busy tone, or the case wherein the wireless device of the called party 104 is switched off or is out of the coverage area. When the called party 104 views the record of missed call, the wireless device 104 of the called party 104 generates a notification, which is sent to the application server 103 present in network 301 through network 302. The wireless device can send the notification to the application server 103 on receiving a confirmation from the called party 104. The wireless device can also send the notification to the application server 103 automatically i.e. without any confirmation from the called party 104. The notification comprises of information like time the called party 104 viewing the missed call, the address of the calling party 101 as the destination address and so on. The notification may also be defined by the called party 104. The notification may be in the form of a SMS, MMS, WAP message or any other suitable means of messaging. The notification is sent to the application server 103 which checks to ensure the calling party 101 is a subscriber of the service. On confirming the subscription of the calling party 101, the application server 103 forwards the notification to the calling party 101, hereby notifying the calling party 101 of the missed call being viewed by the called party 104. For the purpose of charging for the subscription the application server number gets stored in the wireless device of the called party 104. As per the subscription model, the charges of the notification are borne by the calling party 101 who initiated the missed call. However, it is also possible for the called party 104 to accept the charges for the notification service.

Figure 4:
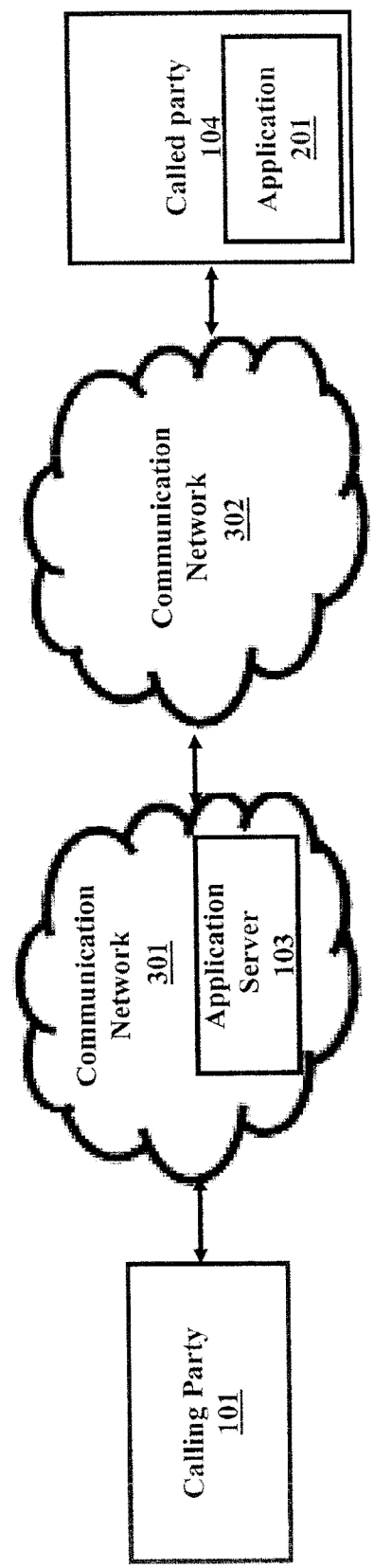
FIG. 4 is a block diagram illustrating a system for notification for acknowledgement of missed calls, in accordance with the embodiments herein.

FIG. 4 is a block diagram illustrating a system to provide notification for acknowledgment of missed calls by the called party, in accordance with the embodiments herein. A calling party 101 initiates a call to a called party 104 through networks 301 and 302, wherein the calling party 101 belongs to network 301 and the called party 104 belongs to network 302. The network 301 also comprises of an application server 103. The call may be a missed call if the called party 104 fails to pick up the call. A missed call may be a call which is not answered by the called party 104, a call that returns a busy tone, or the case wherein the wireless device of the called party 104 is switched off or is out of the coverage area. When the called party 104 views the record of missed call, the application 201 on the wireless device is activated. The application 201 will generate a notification which can be user defined. The application 201 can send the notification to the application server 103 present in network 301 through network 302 on receiving a confirmation from the called party 104. The application 201 can also be configured so that the called party 104 is not notified before sending the acknowledgement for the missed call. This is the case where the called party has provisioned the application to send notification unsolicited upon acknowledgment of the missed call. The application 201 can be configured not to send any notification to the calling party 101. The application 201 can also provide the called party with the option of defining the text that goes as part of the notification. The notification comprises of information like time the called party 104 viewing the missed call, the address of the calling party 101 as the destination address and so on. The notification may also be defined by the called party 104. The notification may also be defined by the called party 104. The notification may be in the form of a SMS, MMS, WAP message or any other suitable means of messaging. The notification is sent to the application server 103 which checks to ensure the calling party 101 is a subscriber of the service. On confirming the subscription of the calling party 101, the application server 103 forwards the notification to the calling party 101, hereby notifying the calling party 101 of the missed call being viewed by the called party 104. For the purpose of charging for the subscription the application server number gets stored in the wireless device of the called party 104. As per the subscription model, the charges of the notification are borne by the calling party 101 who initiated the missed call. However, it is also possible for the called party 104 to accept the charges for the notification service.

Figure 5:
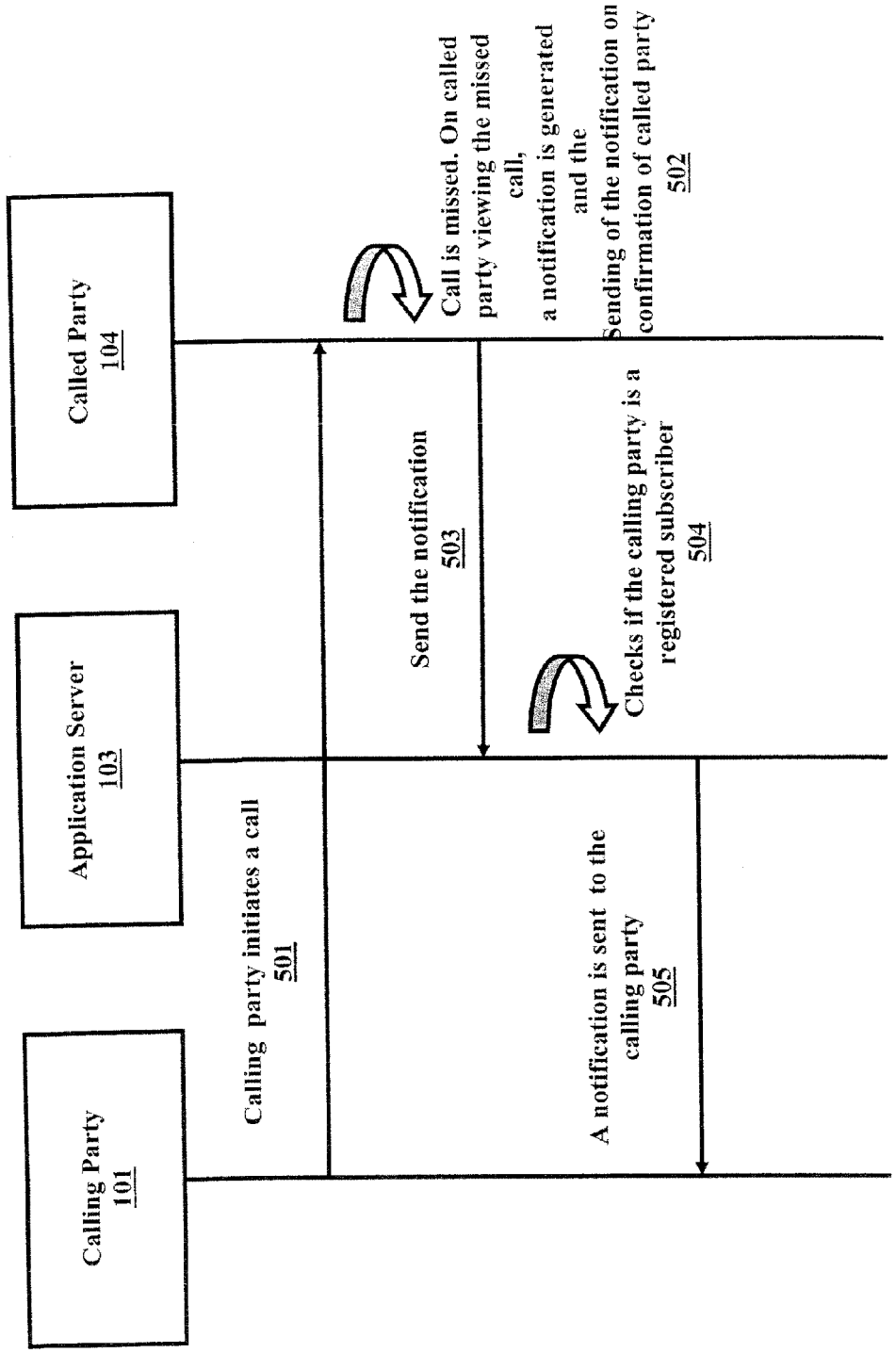
FIG. 5 illustrates a flow diagram for sending a notification for acknowledgement of missed call to the calling party, on confirmation by the called party, in accordance with the embodiments herein.

FIG. 5 illustrates a flow diagram for sending a notification of missed call to the calling party, on confirmation by the called party, in accordance with the embodiments herein. The calling party 101 initiates (501) a call to the called party 104. The network 102 may comprise of a single network, where the calling party 101 and the called party 104 belong to the same network 102. The called party 104 and the calling party 101 may belong to different networks, wherein the calling party 101 belongs to network 301 and the called party 104 belongs to network 302. A call may be a missed call if the called party 104 fails to pick up the call. A missed call may be defined as a call which is not answered by the called party 104, a call that returns a busy tone, or the case wherein the wireless device of the called party 104 is switched off or is out of the coverage area. The missed call gets recorded in the list of missed calls in the wireless communication device of the called party 104. Both the calling party 101 and the called party 104 subscribe for the notification service. When the called party 104 views the record of missed call, the wireless device of the called party 104 generates (502) a notification. A pop up may appear on the wireless device of the called party 104. The pop up asks for a confirmation from the called party 104 for sending the notification. When the called party 104 confirms, the wireless device of the called party 104 sends (503) a notification to the application server 103. The notification comprises of information like time the called party 104 viewing the missed call, the address of the calling party 101 as the destination address and so on. The notification may also be defined by the called party 104. The notification may be in the form of a SMS, MMS, WAP message or any other suitable means of messaging. The application server 103 checks (504)

the subscription of the calling party 101 to confirm if the calling party 101 is a registered subscriber for the notification service. Further, if the calling party 101 is a registered subscriber for the notification service, the application server 103 forwards (505) the notification to the calling party 101. For the purpose of charging for the subscription number of the application server 103 is stored in the wireless device of the called party 104. As per the subscription model, the charges of the notification are borne by the calling party 101 who initiated the missed call. However, it is also possible for the called party 104 to accept the charges for the notification service.

Figure 6A:
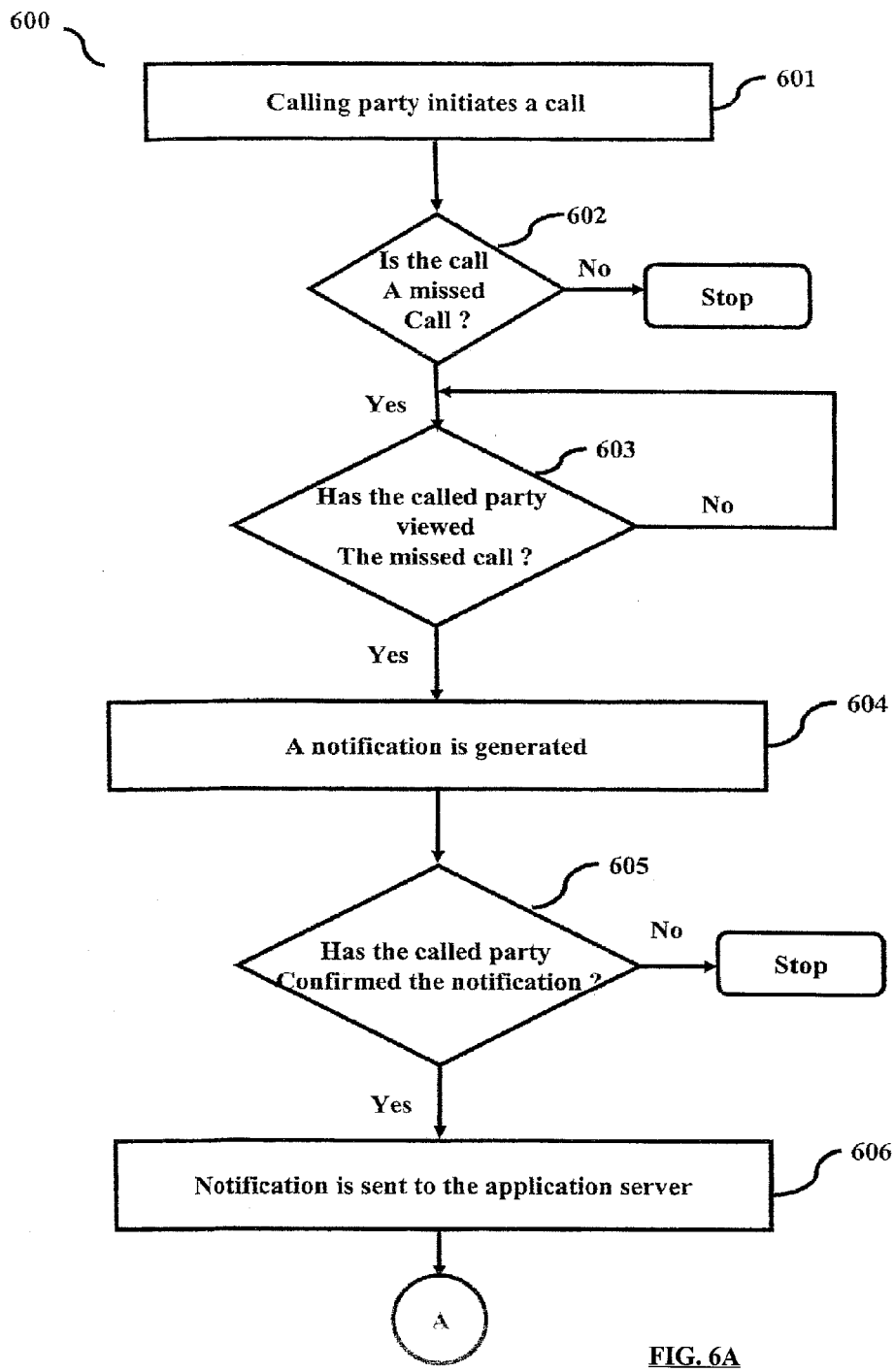
FIG. 6 is a flow chart depicting a method of sending a notification for acknowledgement of missed call to the calling party, on confirmation by the called party, in accordance with the embodiments herein.
Figure 6B:
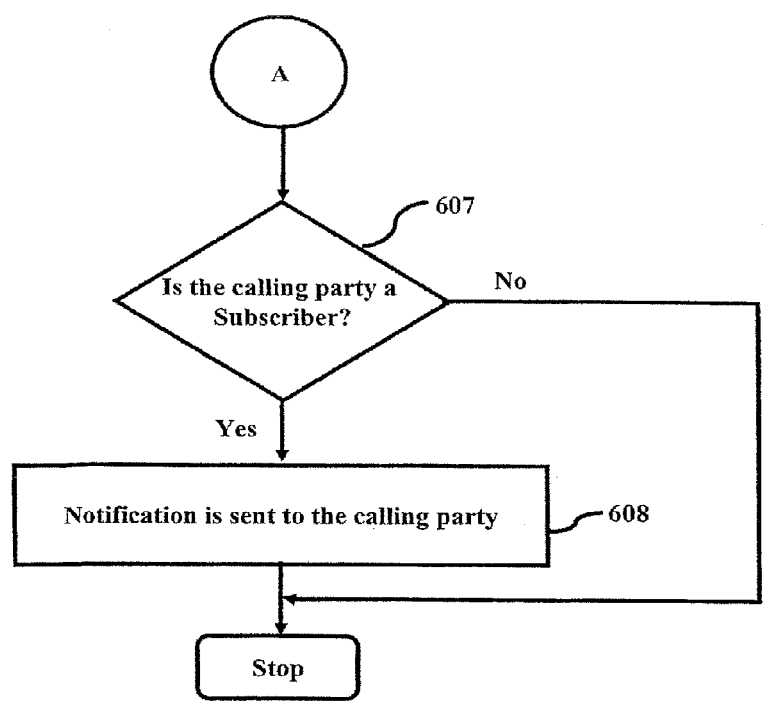

FIG. 6 is a flow chart depicting a method of sending a notification for acknowledgment of missed call to the calling party, on confirmation by the called party, in accordance with the embodiments herein. A calling party 101 makes (601) a call to a called party 104. The call may result in a missed call as the called party 104 may be busy to address the call or may be out of coverage area of the network. The missed call gets recorded in the list of missed calls on the wireless device of the called party 104. The wireless device of the called party 104 checks (603) if the called party 104 has viewed the record of the missed call from the calling party 101. Once the called party 104 views the record, the wireless device of the called party 104 generates (604) a notification on the wireless device of the called party 104. The wireless device of the called party 104 asks (605) for confirmation from the called party 104 using a pop up. On receiving a confirmation from the called party 104, the wireless device of the called party 104 sends (606) the notification to the application server 103. The notification comprises of information like time the called party 104 viewing the missed call, the address of the calling party 101 as the destination address and so on. The notification may also be defined by the called party 104. The notification may be in the form of a SMS, MMS, WAP message or any other suitable means of messaging. The application server 103 checks (607) whether the calling party 101 is a subscriber of the missed call notification service. If the calling party 101 is a subscriber of the service the application server 103 forwards (608) the notification to the calling party 101. The application server 103 is provided with a number, which gets stored in the wireless device of both the called party 104 and calling party 101. This number can be used for the subscription charges. Subscription ensures the charges of the notification are borne by the calling party 101 who initiated the missed call. The various actions in method 600 may be performed in the order presented, in a different order or simultaneously. Further, in some embodiments, some actions listed in FIG. 6 may be omitted.

Figure 7:
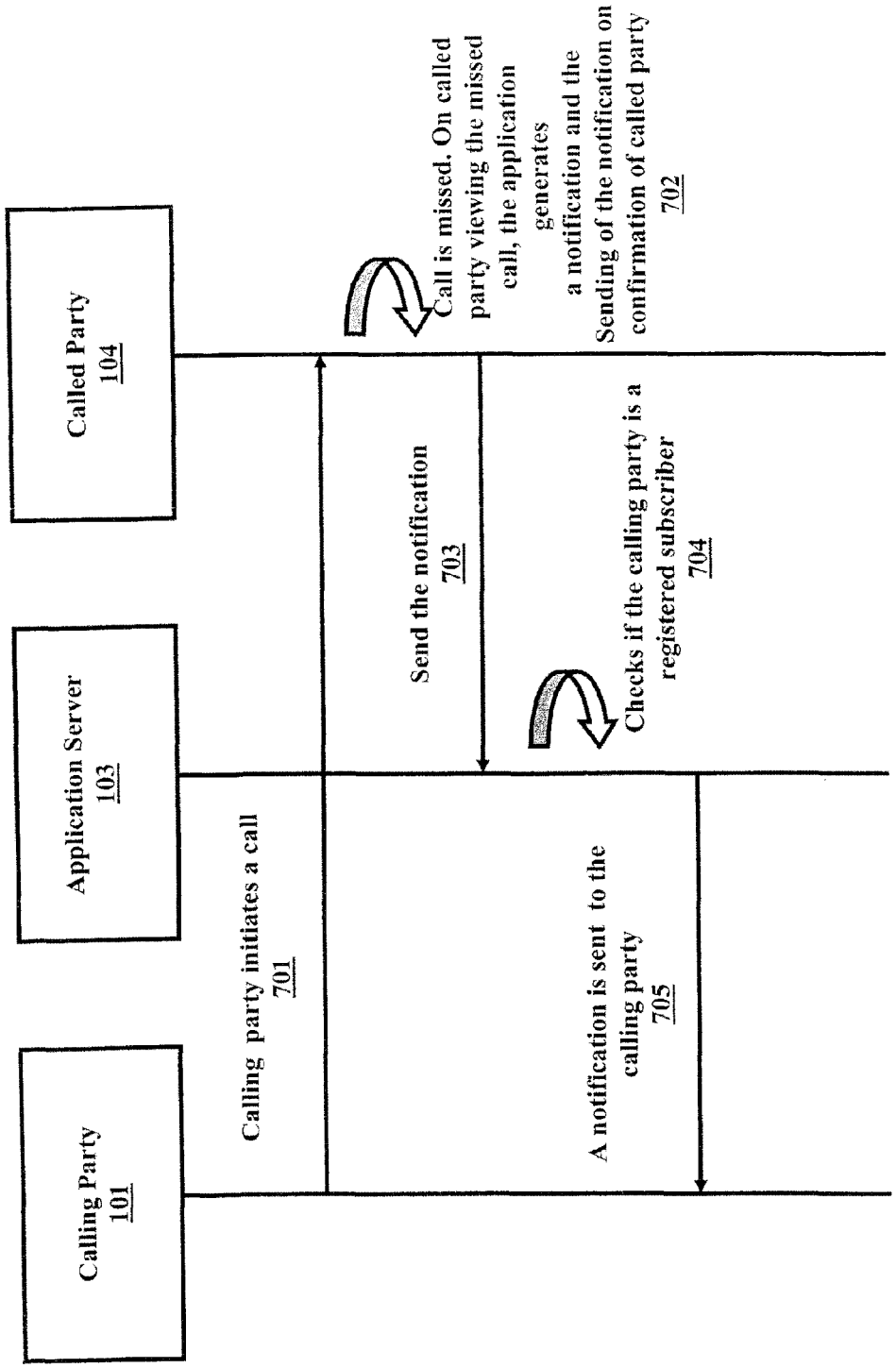
FIG. 7 illustrates a flow diagram for sending a notification for acknowledgement of missed call to the calling party, on confirmation by the called party, in accordance with the embodiments herein.

FIG. 7 illustrates a flow diagram for sending a notification for acknowledgement of missed call to the calling party, on confirmation by the called party, in accordance with the embodiments herein. The calling party 101 initiates (701) a call to the called party 104 through the communication network 102. The network 102 may comprise of a single network, where the calling party 101 and the called party 104 belong to the same network 102. The called party 104 and the calling party 101 may belong to different networks, wherein the calling party 101 belongs to network 301 and the called party 104 belongs to network 302. A call may be a missed call if the called party 104 fails to pick up the call. A missed call may be defined as a call which is not answered by the called party 104, a call that returns a busy tone, or the case wherein the wireless device of the called party 104 is switched off or is out of the coverage area. The missed call gets recorded in the list of missed calls in the wireless communication device of the called party 104. Both the calling party 101 and the called party 104 subscribe for the notification service. When the called party 104 views the record of missed call, the application 201 on the wireless device of the called party 104 is activated. The application 201 generates (702) a notification. When the called party 104 confirms, the application 201 sends (703) the notification to the application server 103. The application server 103 checks (704) the subscription of the calling party 101 to confirm if the calling party 101 is a registered subscriber for the notification service. Further, if the calling party 101 is a registered subscriber for the notification service, the application server 103 forwards (705) the notification to the calling party 101. The notification comprises of information like time the called party 104 viewing the missed call, the address of the calling party 101 as the destination address and so on. The notification may also be defined by the called party 104. The notification may be in the form of a SMS, MMS, WAP message or any other suitable means of messaging. For the purpose of charging for the subscription number of the application server 103 is stored in the wireless device of the called party 104. As per the subscription model, the charges of the notification are borne by the calling party 101 who initiated the missed call. However, it is also possible for the called party 104 to accept the charges for the notification service.

Figure 8A:
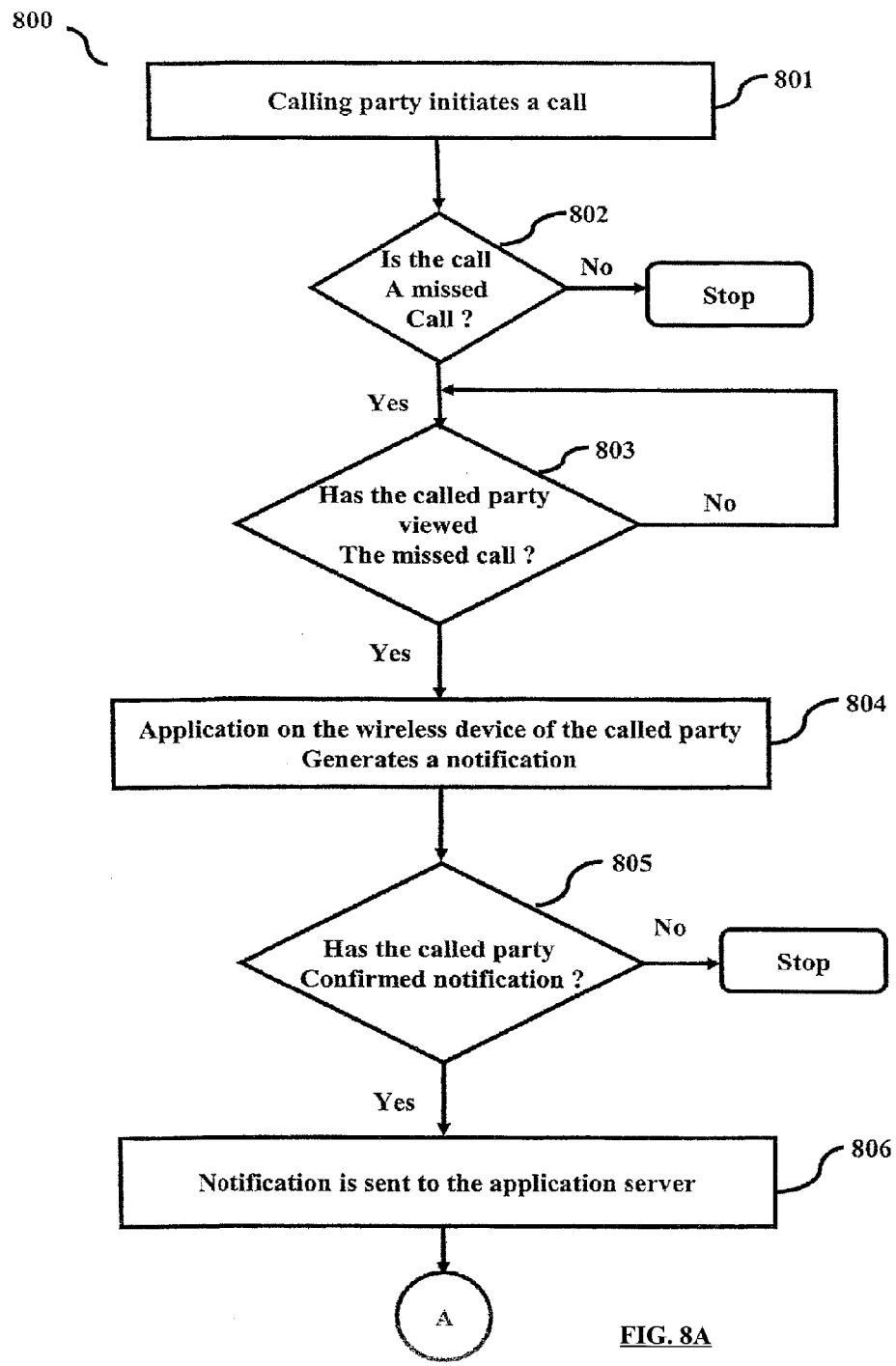
FIG. 8 is a flow chart depicting a method of sending a notification for acknowledgement of missed call to the calling party, on confirmation by the called party, in accordance with the embodiments herein.
Figure 8B:
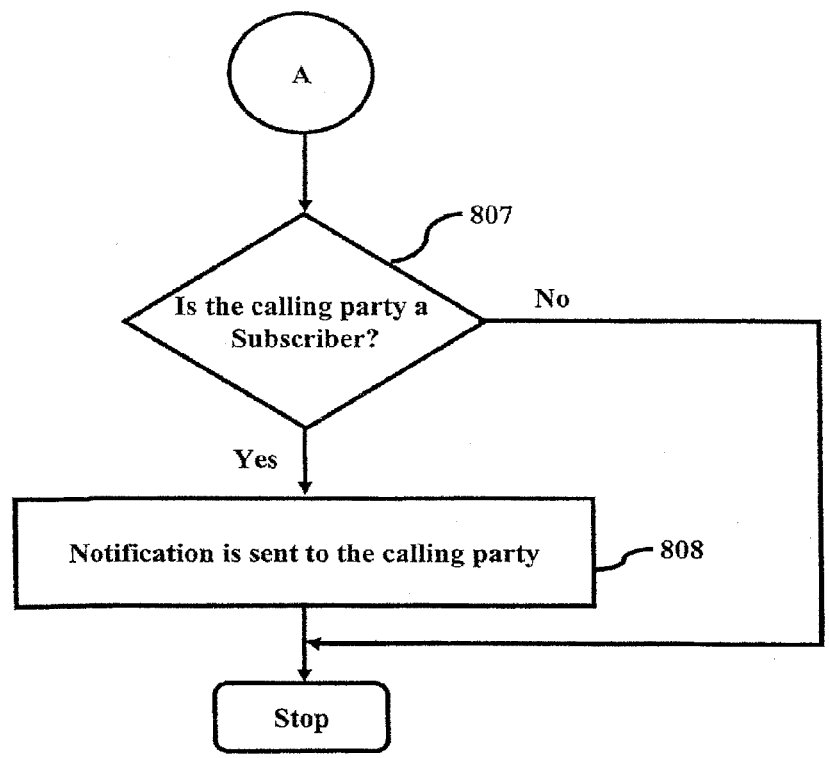

FIG. 8 is a flow chart depicting a method of sending a notification for acknowledgement of missed call to the calling party, on confirmation by the called party, in accordance with the embodiments herein. A calling party 101 makes (801) a call to a called party 104. The call may result in a missed call as the called party 104 may be busy to address the call or may be out of coverage area of the network. The missed call gets recorded in the list of missed calls on the wireless device of the called party 104. The calling party 101 as well as the called party 104 install the application 201 on their wireless device. The application 201 checks (803) if the called party 104 has viewed the record of the missed call from the calling party 101. Once the called party 104 views the record, the application 201 generates (804) a notification on the wireless device of the called party 104. The application 201 asks (805) for confirmation from the called party 104 using a pop up. On receiving a confirmation from the called party 104, the application 201 sends (806) the notification to the application server 103. The notification comprises of information like time the called party 104 viewing the missed call, the address of the calling party 101 as the destination address and so on. The notification may also be defined by the called party 104. The notification may be in the form of a SMS, MMS, WAP message or any other suitable means of messaging. The application server 103 checks (807) whether the calling party 101 is a subscriber of the missed call notification service. If the calling party 101 is a subscriber of the service the application server 103 forwards (808) the notification to the calling party 101 via the communication network 102. The application server 103 is provided with a number, which gets stored in the wireless device of both the called party 104 and calling party 101. This number can be used for the subscription charges. As per the subscription model, the charges of the notification are borne by the calling party 101 who initiated the missed call. However, it is also possible for the called party 104 to accept the charges for the notification service. The various actions in method 800 may be performed in the order presented, in a different order or simultaneously. Further, in some embodiments, some actions listed in FIG. 8 may be omitted.

Figure 9:
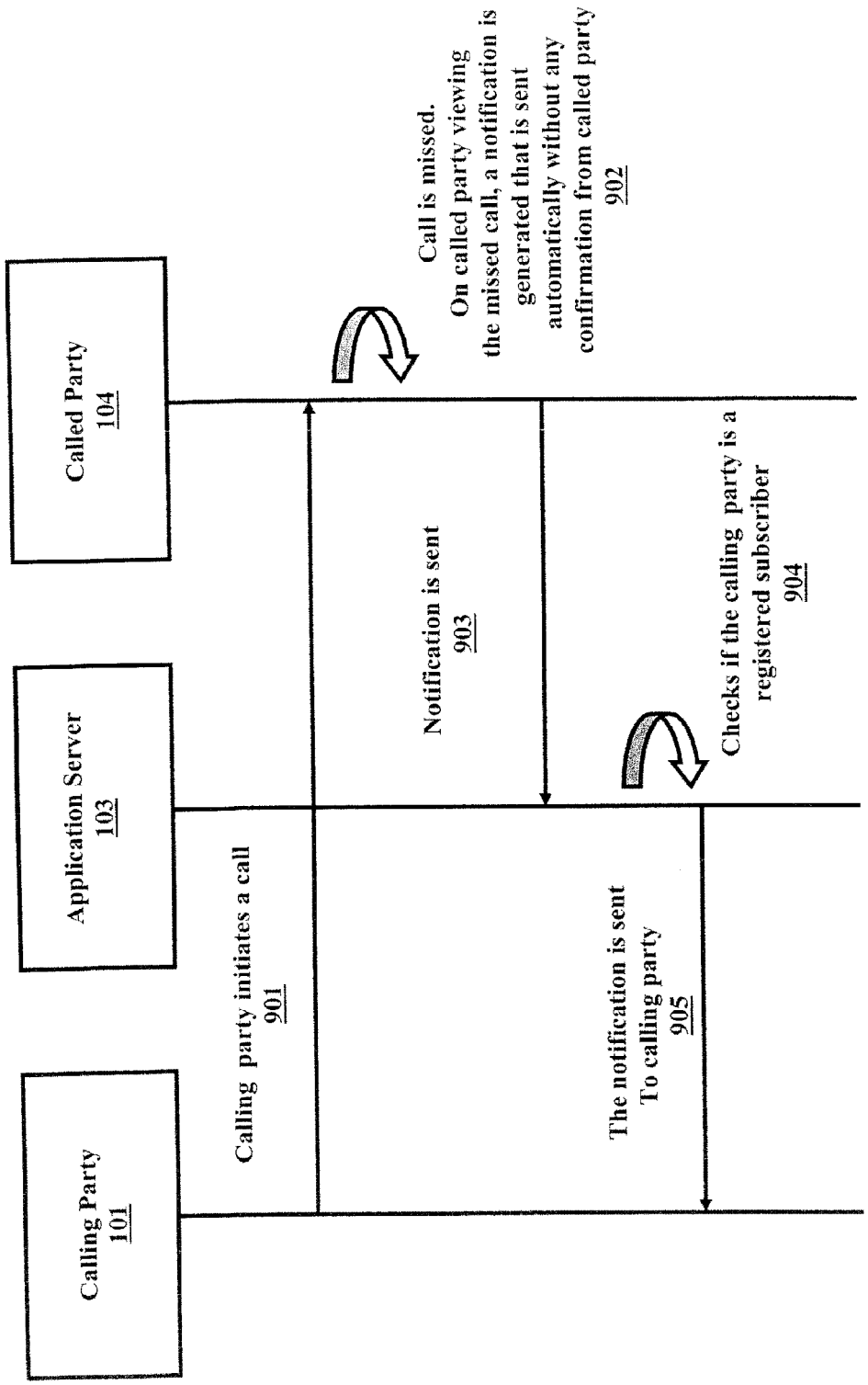
FIG. 9 illustrates a flow diagram for sending a notification for acknowledgement of missed call to the calling party, without any confirmation from the called party, in accordance with the embodiments herein.

FIG. 9 illustrates a flow diagram for sending a notification for acknowledgement of missed call to the calling party, without any confirmation required from the called party, in accordance with the embodiments herein. A calling party 101 initiates (901) a call to a called party 103. The network 102 may comprise of a single network, where the calling party 101 and the called party 104 belong to the same network 102. The called party 104 and the calling party 101 may belong to different networks, wherein the calling party 101 belongs to network 301 and the called party 104 belongs to network 302. The call may result in a missed call as the calling party 101 may be busy or may be out of coverage area of the network. The missed call is recorded in the wireless device of the called party 104. Both the calling party 101 and the called party 104 subscribe for the notification service. When the called party 104 views the record of missed call the wireless device of the called party 104 generates (902) a notification. The notification is sent (903) to the application server 103, without any confirmation from the called party 104. Application server on receiving (904) the notification confirms the subscription of the calling party 101 for the notification service. Further if the calling party 104 is a registered subscriber for the notification service, the application server 103 forwards (905) the notification to the calling party 104. The notification comprises of information like time the called party 104 viewing the missed call, the address of the calling party 101 as the destination address and so on. The notification may also be defined by the called party 104. The notification may be in the form of a SMS, MMS, WAP message or any other suitable means of messaging. The number of the application server 103 number is stored in the wireless device of both calling party 101 and called party 104. This number can be used for the subscription charges. As per the subscription model, the charges of the notification are borne by the calling party 101 who initiated the missed call. However, it is also possible for the called party 104 to accept the charges for the notification service.

Figure 10A:
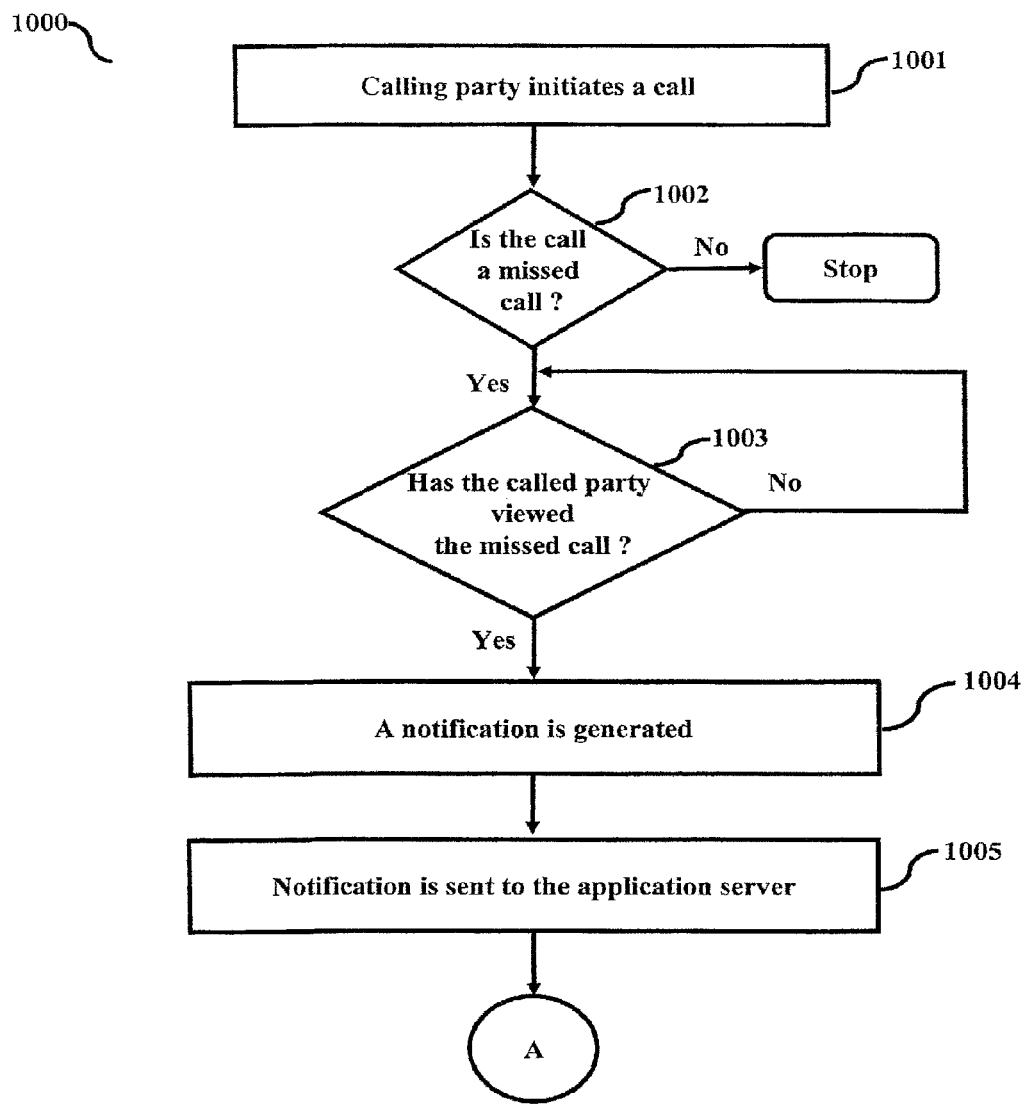
FIG. 10 is a flow chart depicting a method of sending a notification for acknowledgement of missed call to the calling party, without the confirmation of the called party, in accordance with the embodiments herein.
Figure 10B:
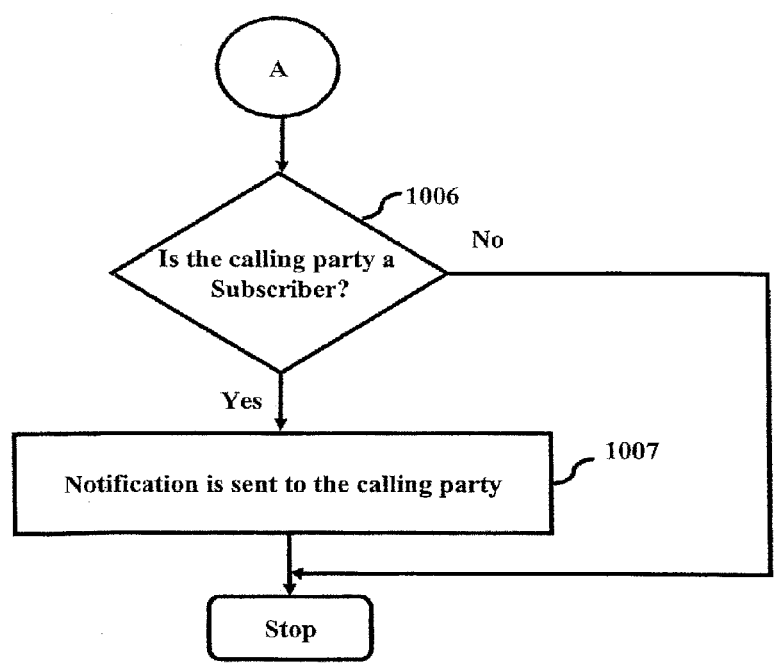

FIG. 10 is a flow diagram depicting a method of sending a notification for acknowledgement of missed call to the calling party, without the confirmation of the called party, in accordance with the embodiments herein. A Calling party 101 initiates (1001) a call to a called party 103. The network 102 may comprise of a single network, where the calling party 101 and the called party 104 belong to the same network 102. The called party 104 and the calling party 101 may belong to different networks, wherein the calling party 101 belongs to network 301 and the called party 104 belongs to network 302. The call may be a missed call as the calling party 101 may be busy or may be out of coverage area of the network. The missed call is recorded in the list of missed calls in the wireless device of the called party 104. The application server 103 checks (1002) if the call is a missed call. If the call is not a missed call the process terminates. The wireless device of the called party 104 checks (1003) if the called party 104 has viewed the record of the missed call by the called party 104. Once the called party 104 views the record, the wireless device of the called party 104 generates (1004) a notification. The notification is sent (1005) to the application server 103 without any confirmation required from the called party 104. The application server 103 checks (1006) whether the calling party 101 is a subscriber of the missed call notification service. If the calling party 101 is a subscriber of the notification service the application server 103 forwards (1007) the notification to the calling party 101 via the communication network 102. Application server 201 is provided with a number that is stored in the wireless device of both calling party 101 and called party 103. This number can be used for the subscription charges. Subscription ensures the charges of the notification are borne by the calling party 101 who initiated the missed call. The various actions in method 1000 may be performed in the order presented, in a different order or simultaneously. Further, in some embodiments, some actions listed in FIG. 10 may be omitted.

Figure 11:
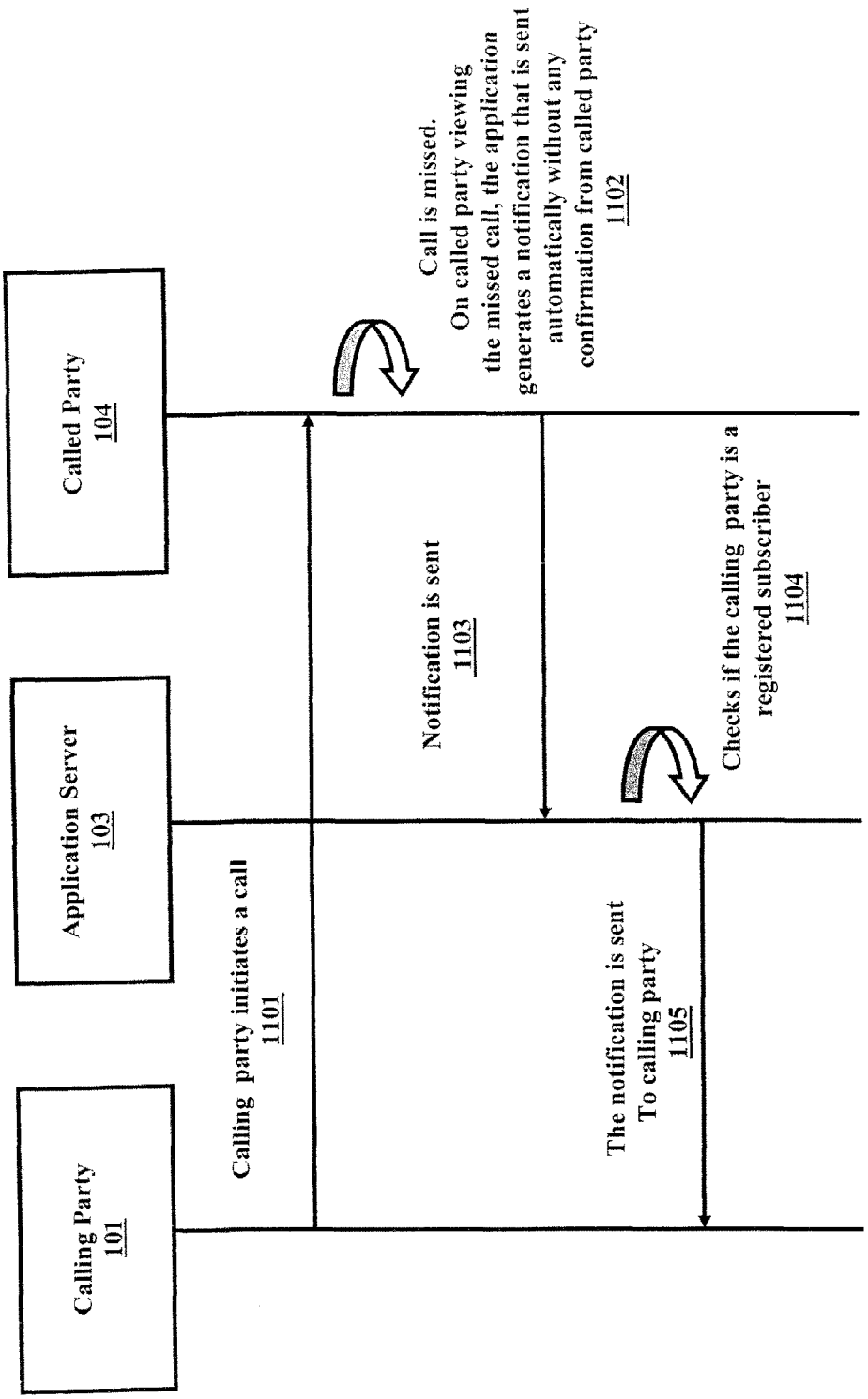
FIG. 11 illustrates a flow diagram for sending a notification for acknowledgement of missed call to the calling party, without any confirmation from the called party, in accordance with the embodiments herein.

FIG. 11 illustrates a flow diagram for sending a notification for acknowledgement of missed call to the calling party, without any confirmation required from the called party, in accordance with the embodiments herein. A calling party 101 initiates (1101) a call to a called party 103 through the network 102. The network 102 may comprise of a single network, where the calling party 101 and the called party 104 belong to the same network 102. The called party 104 and the calling party 101 may belong to different networks, wherein the calling party 101 belongs to network 301 and the called party 104 belongs to network 302. The call may result in a missed call as the calling party 101 may be busy or may be out of coverage area of the network. The missed call is recorded in the wireless device of the called party 104. Both the calling party 101 and the called party 104 subscribe for the notification service. When the called party 104 views the record of missed call, the application 201 on the device of the called party 104 is activated. The application 105 generates (1102) a notification. The notification is sent (1103) to the application server 103, without any confirmation from the called party 104. Application server on receiving (1104) the notification confirms the subscription of the calling party 101 for the notification service. Further if the calling party 104 is a registered subscriber for the notification service, the application server 103 forwards (1105) the notification to the calling party 104. The notification comprises of information like time the called party 104 viewing the missed call, the address of the calling party 101 as the destination address and so on. The notification may also be defined by the called party 104. The notification may be in the form of a SMS, MMS, WAP message or any other suitable means of messaging. The number of the application server 103 number is stored in the wireless device of both calling party 101 and called party 104. This number can be used for the subscription charges. As per the subscription model, the charges of the notification are borne by the calling party 101 who initiated the missed call. However, it is also possible for the called party 104 to accept the charges for the notification service.

Figure 12A:
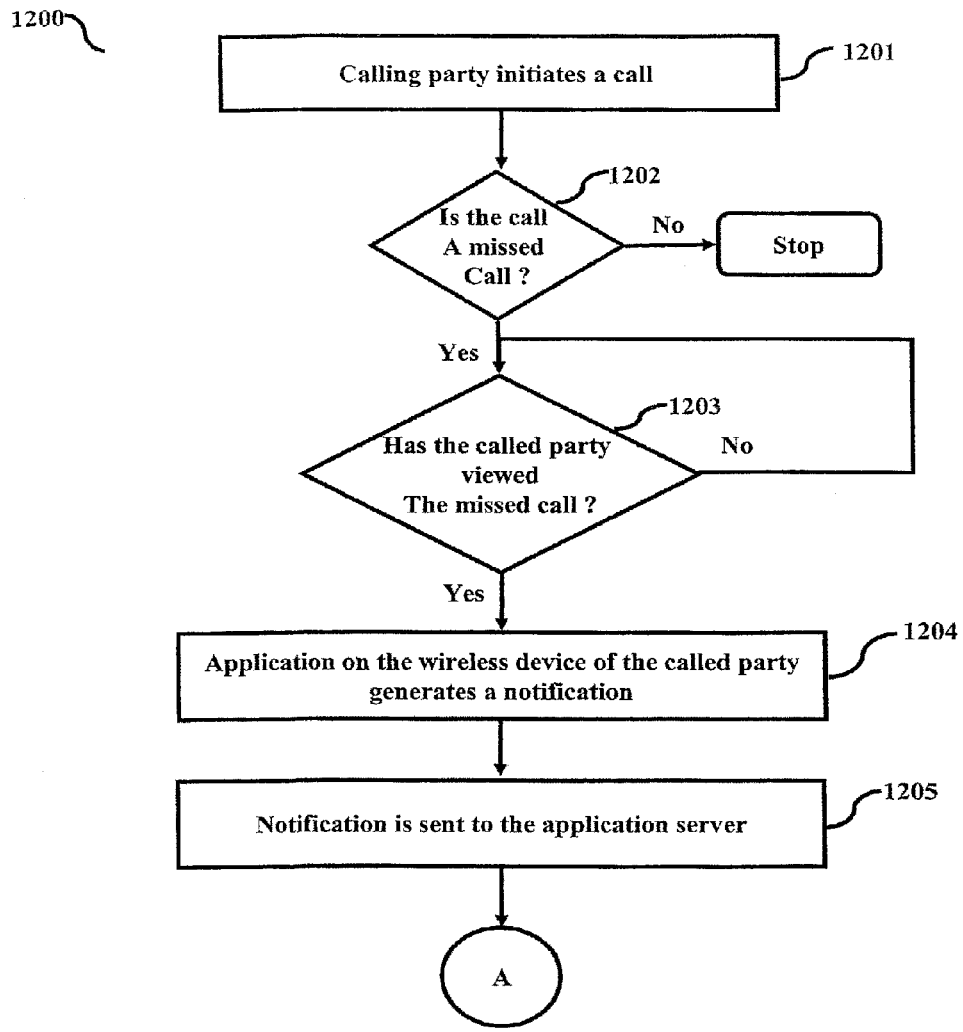
FIG. 12 is a flow chart depicting a method of sending a notification for acknowledgement of missed call to the calling party, without the confirmation of the called party, in accordance with the embodiments herein.
Figure 12B:
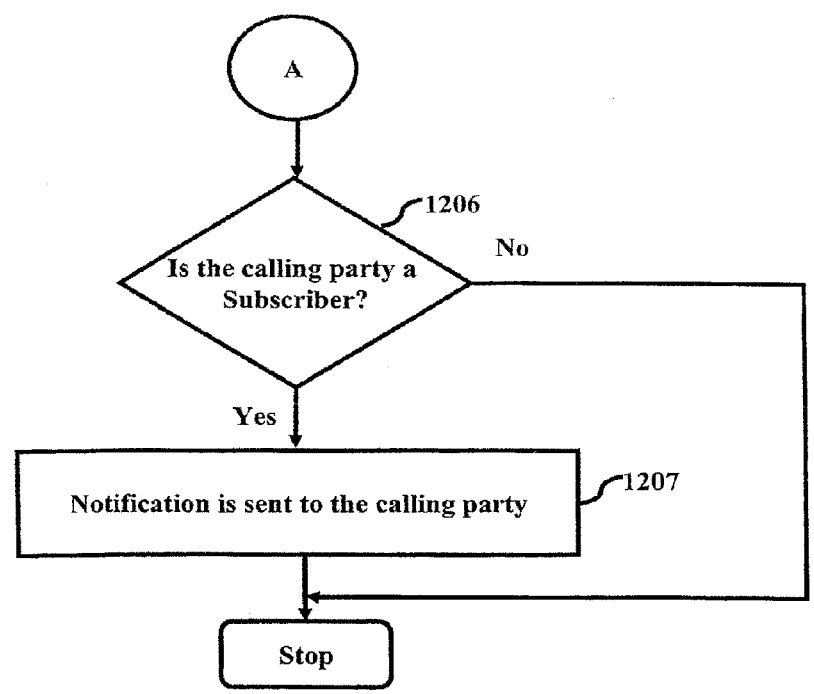

FIG. 12 is a flow chart depicting a method of sending a notification for acknowledgement of missed call to the calling party, without the confirmation of the called party, in accordance with the embodiments herein. A Calling party 101 initiates (1201) a call to a called party 103. The network 102 may comprise of a single network, where the calling party 101 and the called party 104 belong to the same network 102. The called party 104 and the calling party 101 may belong to different networks, wherein the calling party 101 belongs to network 301 and the called party 104 belongs to network 302. The call may be a missed call as the calling party 101 may be busy or may be out of coverage area of the network. The missed call is recorded in the list of missed calls in the wireless device of the called party 104. The application server 103 checks (1202) if the call is a missed call. If the call is not a missed call the process terminates. The calling party 101 as well as the called party 104 have an application 201 installed on their wireless device. The application 201 may be modified as per the requirements of the user of the wireless device. The application 201 checks (1203) if the called party 104 has viewed the record of the missed call by the called party 104. Once the called party 104 views the record, the application 201 generates (1204) a notification. The application sends (1205) the notification to the application server 103 without any confirmation required from the called party 104. The notification comprises of information like time the called party 104 viewing the missed call, the address of the calling party 101 as the destination address and so on. The notification may also be defined by the called party 104. The notification may be in the form of a SMS, MMS, WAP message or any other suitable means of messaging. The application server 103 checks (1206) whether the calling party 101 is a subscriber of the missed call notification service. If the calling party 101 is a subscriber of the notification service the application server 103 forwards (1207) the notification to the calling party 101 via the communication network 102. Application server 201 is provided with a number that is stored in the wireless device of both calling party 101 and called party 103. This number can be used for the subscription charges. As per the subscription model, the charges of the notification are borne by the calling party 101 who initiated the missed call. However, it is also possible for the called party 104 to accept the charges for the notification service. The various actions in method 1200 may be performed in the order presented, in a different order or simultaneously. Further, in some embodiments, some actions listed in FIG. 12 may be omitted.

Figure 13:
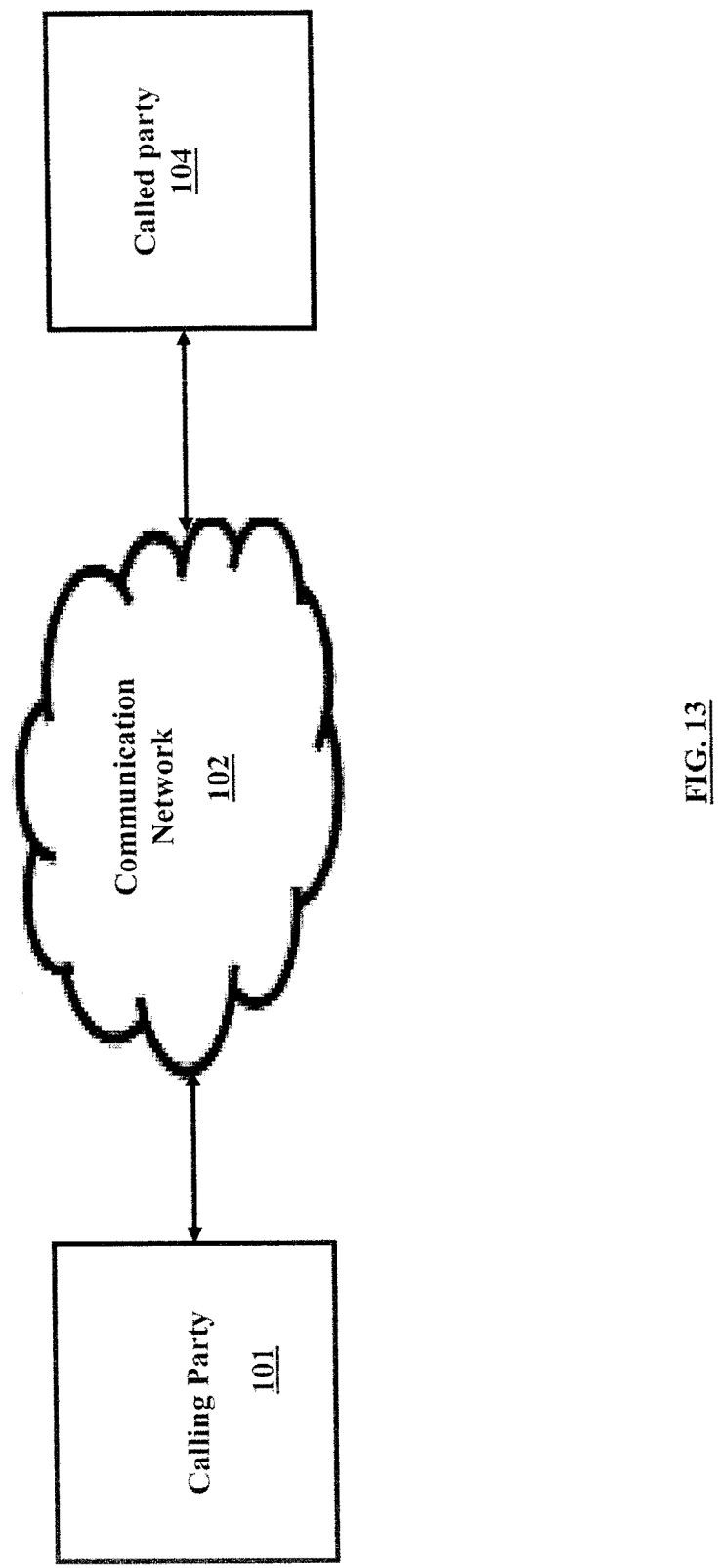
FIG. 13 is a block diagram illustrating a system for notification for acknowledgement of missed calls, in accordance with the embodiments herein.

FIG. 13 is a block diagram illustrating a system to provide notification for acknowledgment of missed calls by the called party, in accordance with the embodiments herein. A calling party 101 initiates a call to a called party 103 through a network 102. The network 102 may comprise of a single network, where the calling party 101 and the called party 104 belong to the same network 102. The called party 104 and the calling party 101 may belong to different networks, wherein the calling party 101 belongs to network 301 and the called party 104 belongs to network 302. The call may be a missed call if the called party 104 fails to pick up the call. A missed call may be a call which is not answered by the called party 104, a call that returns a busy tone, or the case wherein the wireless device of the called party 104 is switched off or is out of the coverage area. When the called party 104 views the record of missed call, the wireless device 104 of the called party 104 generates a notification, which is sent to the network 102. The wireless device can send the notification to the network 102 on receiving a confirmation from the called party 104. The wireless device can also send the notification to the network 102 automatically i.e. without any confirmation from the called party 104. The notification comprises of information like time the called party 104 viewing the missed call, the time the called party got the notification of the missed call, the address of the calling party 101 as the destination address and so on. The notification may also be defined by the called party 104. The notification may be in the form of a SMS, MMS, WAP message or any other suitable means of messaging. The network 102 forwards the notification to the calling party 101, hereby notifying the calling party 101 of the missed call being viewed by the called party 104.

Figure 14:
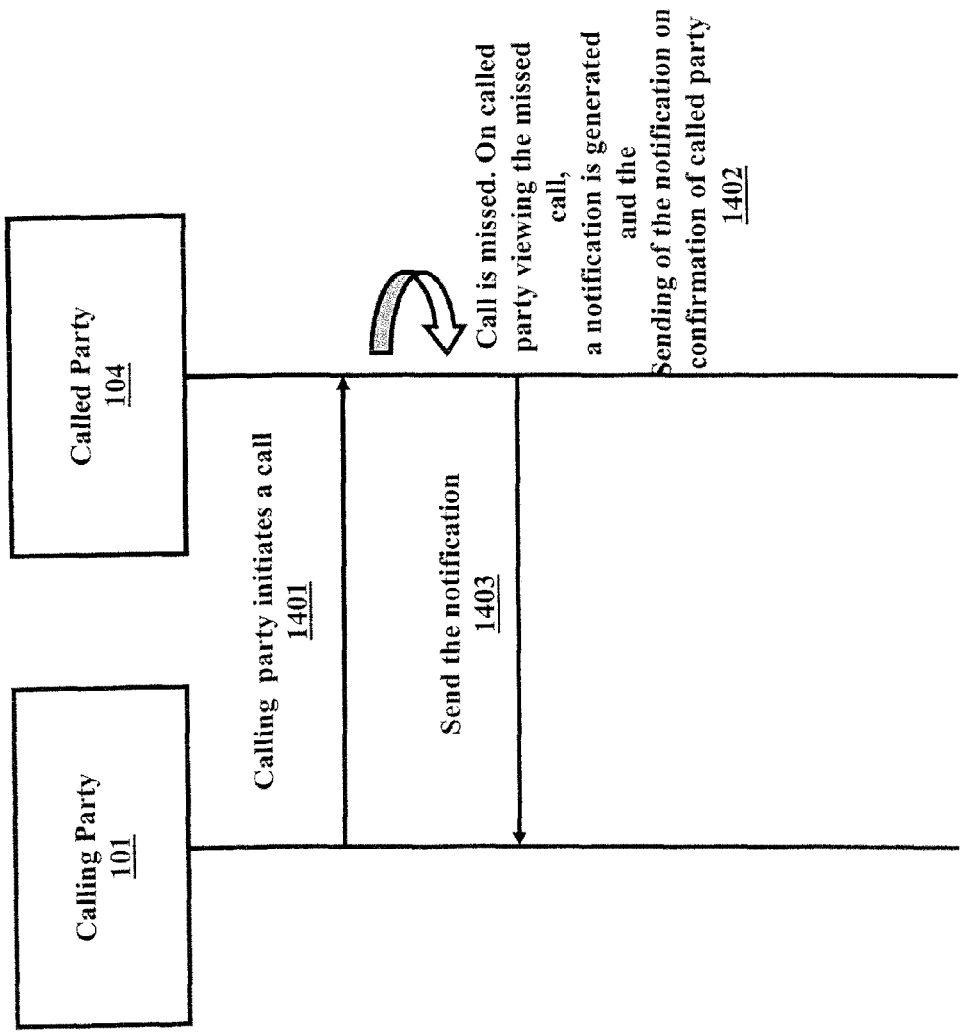
FIG. 14 illustrates a flow diagram for sending a notification for acknowledgement of missed call to the calling party, on confirmation by the called party, in accordance with the embodiments herein.

FIG. 14 illustrates a flow diagram for sending a notification of missed call to the calling party, on confirmation by the called party, in accordance with the embodiments herein. The calling party 101 initiates (1401) a call to the called party 104. The network 102 may comprise of a single network, where the calling party 101 and the called party 104 belong to the same network 102. The called party 104 and the calling party 101 may belong to different networks, wherein the calling party 101 belongs to network 301 and the called party 104 belongs to network 302. A call may be a missed call if the called party 104 fails to pick up the call. A missed call may be defined as a call which is not answered by the called party 104, a call that returns a busy tone, or the case wherein the wireless device of the called party 104 is switched off or is out of the coverage area. The missed call gets recorded in the list of missed calls in the wireless communication device of the called party 104. Both the calling party 101 and the called party 104 subscribe for the notification service. When the called party 104 views the record of missed call, the wireless device of the called party 104 generates (1402) a notification. A pop up may appear on the wireless device of the called party 104. The pop up asks for a confirmation from the called party 104 for sending the notification. When the called party 104 confirms, the wireless device of the called party 104 sends (1403) the notification to the calling party 101. The notification comprises of information like time the called party 104 viewing the missed call, the address of the calling party 101 as the destination address and an on. The notification may also be defined by the called party 104. The notification may be in the form of a SMS, MMS, WAP message or any other suitable means of messaging.

Figure 15:
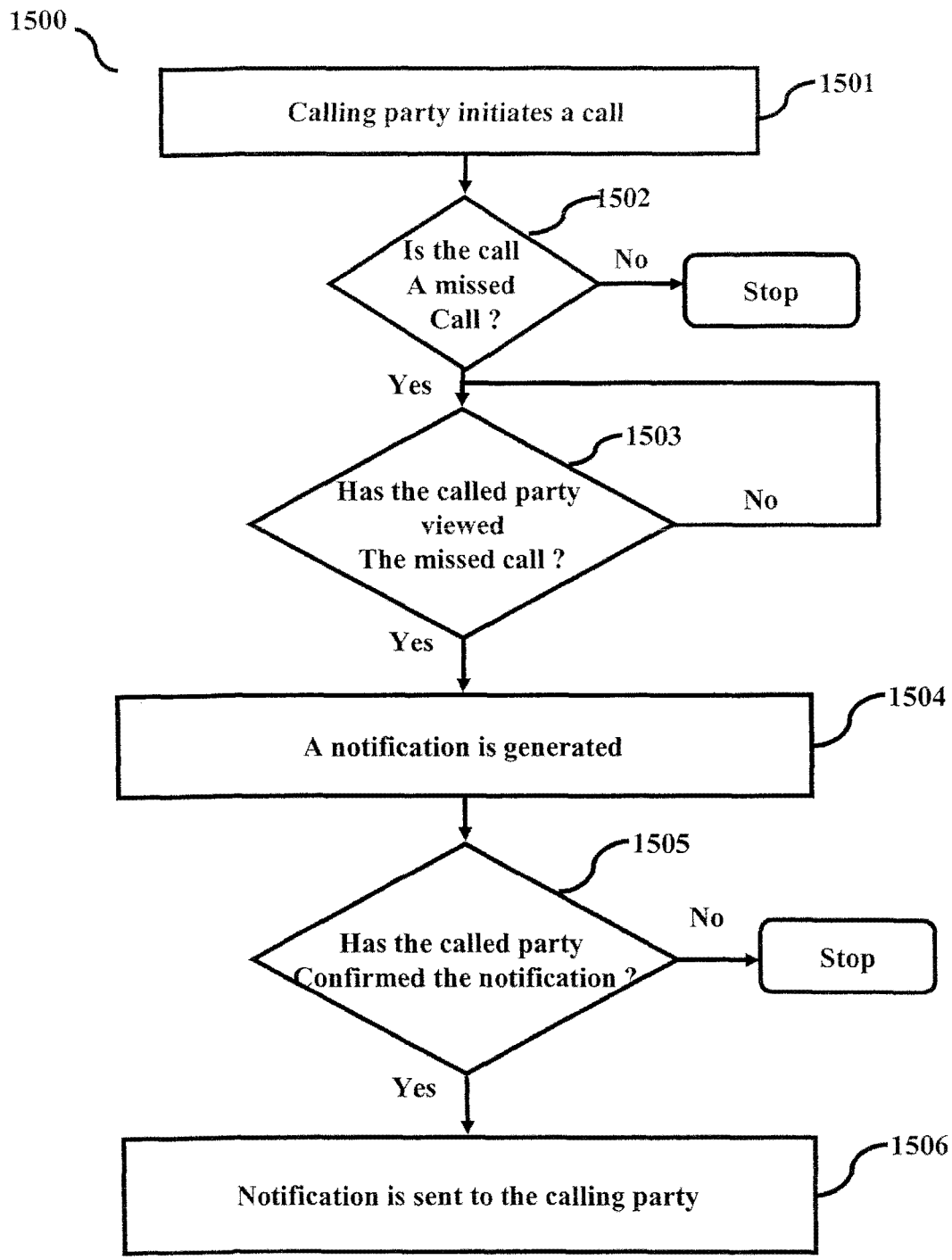
FIG. 15 is a flow chart depicting a method of sending a notification for acknowledgement of missed call to the calling party, on confirmation by the called party, in accordance with the embodiments herein.

FIG. 15 is a flow chart depicting a method of sending a notification for acknowledgment of missed call to the calling party, on confirmation by the called party, in accordance with the embodiments herein. A calling party 101 makes (1501) a call to a called party 104. The call may result in a missed call as the called party 104 may be busy to address the call or may be out of coverage area of the network. The missed call gets recorded in the list of missed calls on the wireless device of the called party 104. The wireless device of the called party 104 checks (1503) if the called party 104 has viewed the record of the missed call from the calling party 101. Once the called party 104 views the record, the wireless device of the called party 104 generates (1504) a notification on the wireless device of the called party 104. The wireless device of the called party 104 asks (1505) for confirmation from the called party 104 using a pop up. On receiving a confirmation from the called party 104, the wireless device of the called party 104 sends (1506) the notification to the calling party 101. The notification comprises of information like time the called party 104 viewing the missed call, the address of the calling party 101 as the destination address and so on. The notification may also be defined by the called party 104. The notification may be in the form of a SMS, MMS, WAP message or any other suitable means of messaging. The various actions in method 1500 may be performed in the order presented, in a different order or simultaneously. Further, in some embodiments, some actions listed in FIG. 15 may be omitted.

Figure 16:
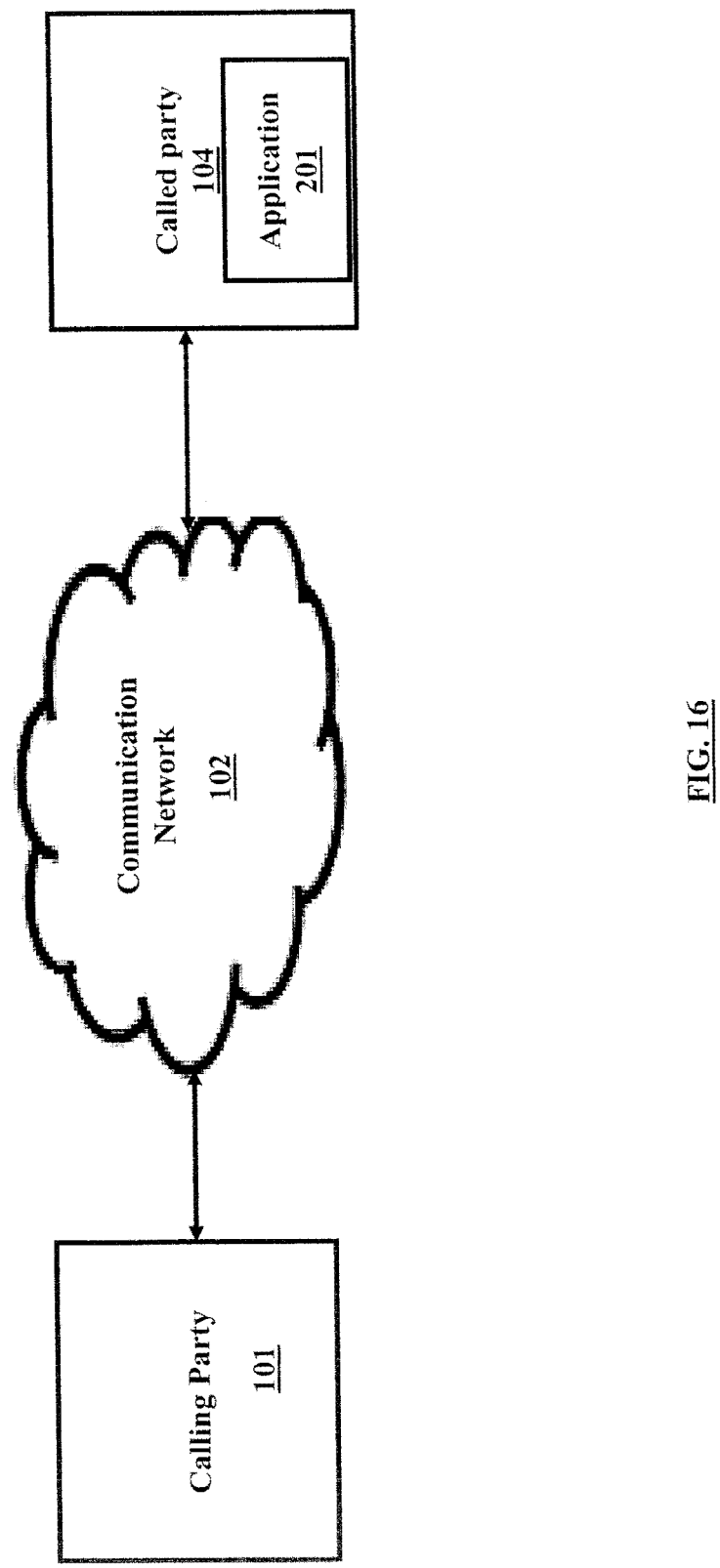
FIG. 16 is a block diagram illustrating a system for notification for acknowledgement of missed calls, in accordance with the embodiments herein.

FIG. 16 is a block diagram illustrating a system to provide notification for acknowledgment of missed calls by the called party, in accordance with the embodiments herein. A calling party 101 initiates a call to a called party 103 through a network 102. The network 102 may comprise of a single network, where the calling party 101 and the called party 104 belong to the same network 102. The called party 104 and the calling party 101 may belong to different networks, wherein the calling party 101 belongs to network 301 and the called party 104 belongs to network 302. The call may be a missed call if the called party 104 fails to pick up the call. A missed call may be a call which is not answered by the called party 104, a call that returns a busy tone, or the case wherein the wireless device of the called party 104 is switched off or is out of the coverage area. When the called party 104 views the record of missed call, the application 201 on the wireless device is activated. The application 201 will generate a notification which can be user defined. The application 201 can send the notification to the network 102 on receiving a confirmation from the called party 104. The application 201 can also be configured so that the called party 104 is not notified before sending the acknowledgement for the missed call. This is the case where the called party has provisioned the application to send notification unsolicited upon acknowledgment of the missed call. The application 201 can be configured not to send any notification to the calling party 101. The application 201 can also provide the called party with the option of defining the text that goes as part of the notification. The notification comprises of information like time the called party 104 viewing the missed call, the address of the calling party 101 as the destination address and so on. The notification may also be defined by the called party 104. The notification may be in the form of a SMS, MMS, WAP message or any other suitable means of messaging. The network 102 forwards the notification to the calling party 101, hereby notifying the calling party 101 of the missed call being viewed by the called party 104.

Figure 17:
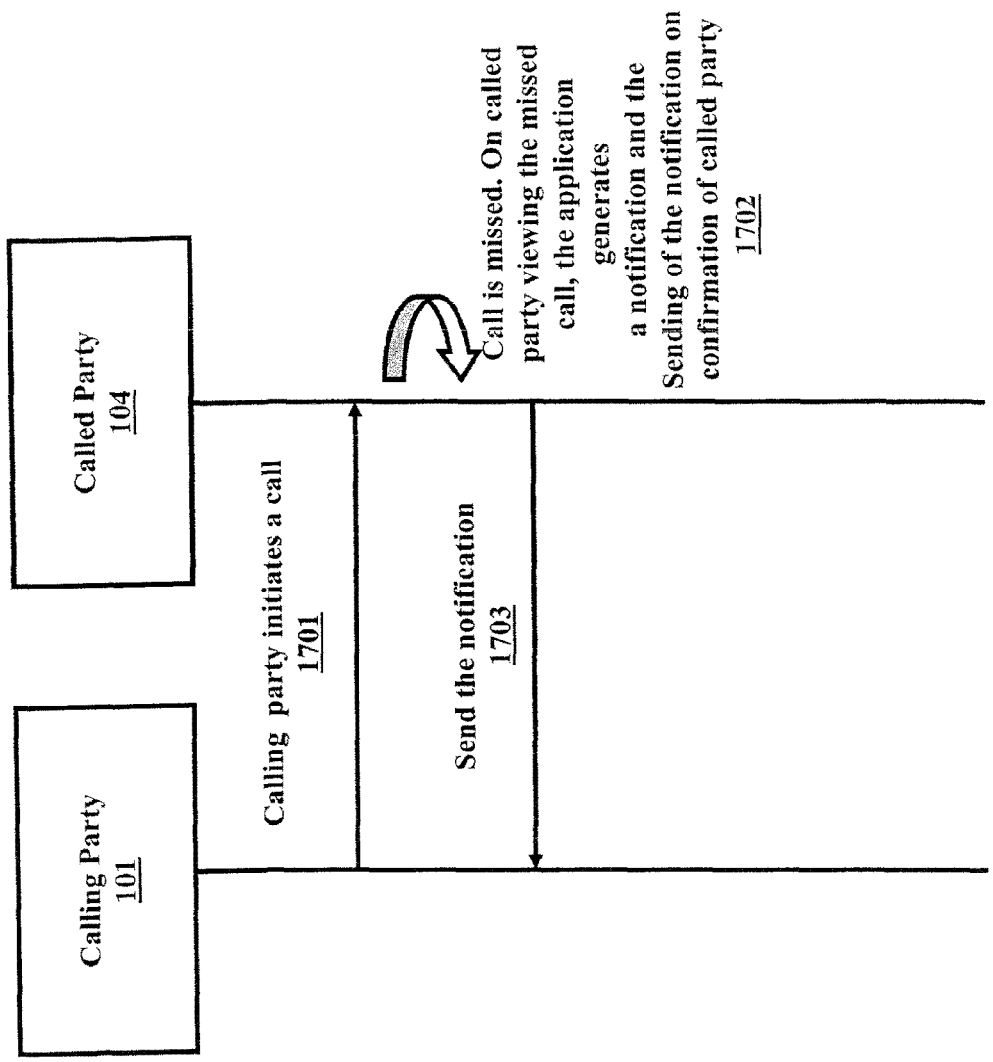
FIG. 17 illustrates a flow diagram for sending a notification for acknowledgement of missed call to the calling party, on confirmation by the called party, in accordance with the embodiments herein.

FIG. 17 illustrates a flow diagram for sending a notification for acknowledgement of missed call to the calling party, on confirmation by the called party, in accordance with the embodiments herein. The calling party 101 initiates (1701) a call to the called party 104 through the communication network 102. The network 102 may comprise of a single network, where the calling party 101 and the called party 104 belong to the same network 102. The called party 104 and the calling party 101 may belong to different networks, wherein the calling party 101 belongs to network 301 and the called party 104 belongs to network 302. A call may be a missed call if the called party 104 fails to pick up the call. A missed call may be defined as a call which is not answered by the called party 104, a call that returns a busy tone, or the case wherein the wireless device of the called party 104 is switched off or is out of the coverage area. The missed call gets recorded in the list of missed calls in the wireless communication device of the called party 104. Both the calling party 101 and the called party 104 subscribe for the notification service. When the called party 104 views the record of missed call, the application 201 on the wireless device of the called party 104 is activated. The application 201 generates (1702) a notification. When the called party 104 confirms, the application 201 sends (1703) the notification to the calling party 101. The notification comprises of information like time the called party 104 viewing the missed call, the address of the calling party 101 as the destination address and so on. The notification may also be defined by the called party 104. The notification may be in the form of a SMS, MMS, WAP message or any other suitable means of messaging.

Figure 18:
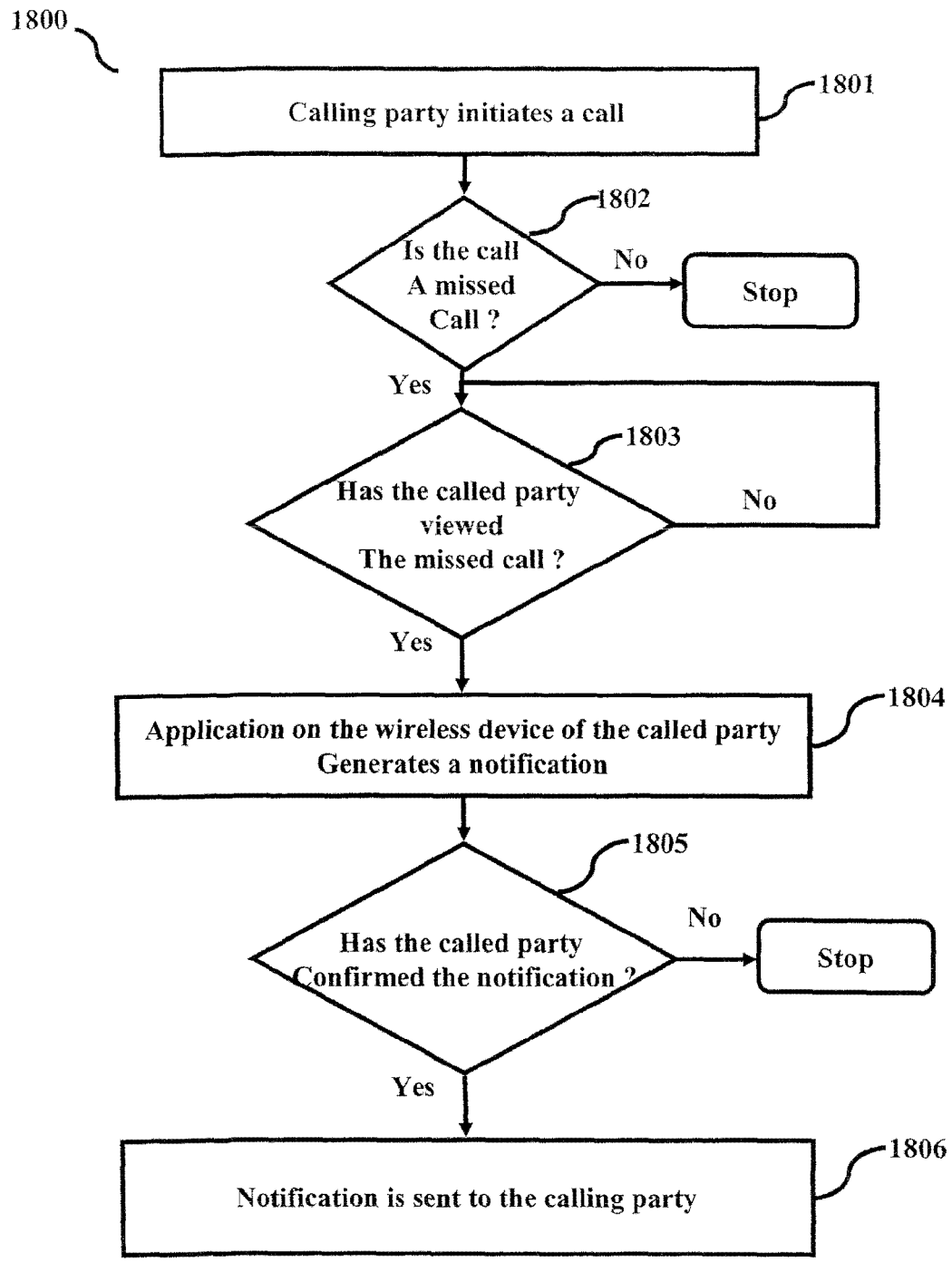
FIG. 18 is a flow chart depicting a method of sending a notification for acknowledgement of missed call to the calling party, on confirmation by the called party, in accordance with the embodiments herein.

FIG. 18 is a flow chart depicting a method of sending a notification for acknowledgement of missed call to the calling party, on confirmation by the called party, in accordance with the embodiments herein. A calling party 101 makes (1801) a call to a called party 104. The call may result in a missed call as the called party 104 may be busy to address the call or may be out of coverage area of the network. The missed call gets recorded in the list of missed calls on the wireless device of the called party 104. The calling party 101 as well as the called party 104 install the application 201 on their wireless device. The application 201 checks (1803) if the called party 104 has viewed the record of the missed call from the calling party 101. Once the called party 104 views the record, the application 201 generates (1804) a notification on the wireless device of the called party 104. The application 201 asks (1805) for confirmation from the called party 104 using a pop up. On receiving a confirmation from the called party 104, the application 201 sends (1806) the notification to the calling party 101. The notification comprises of information like time the called party 104 viewing the missed call, the address of the calling party 101 as the destination address and so on. The notification may also be defined by the called party 104. The notification may be in the form of a SMS, MMS, WAP message or any other suitable means of messaging. The various actions in method 1800 may be performed in the order presented, in a different order or simultaneously. Further, in some embodiments, some actions listed in FIG. 18 may be omitted.

The embodiments disclosed herein can be implemented through at least one software program running on at least one hardware device and performing service management functions for the network elements. The network elements shown in FIGS. 1 to 4 and FIGS. 13 and 16 include blocks which can be at least one of a hardware device, a software module or a combination of hardware device and software module The embodiment disclosed herein specifies a method of providing notification for acknowledgement of missed calls to the calling party. The system is equipped with an application server which confirms the subscription of both the called and calling party to provide the notification facility. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The invention claimed is:

1. A method in a wireless communication system of notifying a calling party when a called party acknowledges a missed called notification, where said calling party initiated said missed call to said called party, said method comprising:
sending a notification to said calling party, on said called party viewing and acknowledging said missed call notification for said missed call from said calling party.

2. The method, as claimed in claim 1, wherein said calling party is subscribed to a notification service which regulates permission of calling parties to use said method.

3. The method, as claimed in claim 1, wherein said called party is subscribed to a notification service which regulates permission of called parties to use said method.

4. The method, as claimed in claim 1, wherein an application present on a communication device of said called party prompts said called party to send a notification.

5. The method, as claimed in claim 1, wherein an application present on a communication device of said called party sends said notification automatically.

6. The method, as claimed in claim 1, wherein an application present on a communication device of said called party sends said notification on receiving a confirmation from said called party.

7. The method, as claimed in claim 1, wherein said notification is one of:
a Short Messaging Service (SMS);
a Multimedia Messaging Service (MMS); and
a Wireless Application Protocol (WAP) message.

8. The method, as claimed in claim 1, wherein said notification is pre-defined by an application present on a communication device of said called party.

9. The method, as claimed in claim 1, wherein said notification is defined by said called party.

10. The method, as claimed in claim 1, wherein said notification is sent to said calling party via an application server.

11. The method, as claimed in claim 1, wherein an application server verifies if said calling party is subscribed to a notification service which regulates permission of calling parties to use said method.

12. The method, as claimed in claim 1, wherein said notification is sent to said calling party through networks of said calling party and said called party directly.

13. A communication device, said device comprising:
   a prompt that, in response to the device receiving a missed call from a calling party and a user of the device accessing a record of said missed call, prompts the user of said communication device to send a notification to said calling party; and
   a sending part operative to send said notification to said calling party.

14. The communication device as claimed in claim 13, wherein said communication device is adapted to send said notification in the form of one of:
   a Short Messaging Service (SMS);
   a Multimedia Messaging Service (MMS); and
   a Wireless Application Protocol (WAP) message.

15. A method in a wireless communication system of notifying a calling party when a called party acknowledges a missed called, said method comprising:
   detecting if a call initiated from the calling party to the called party is missed by the called party;
   updating a list of missed calls on a device of the called party, wherein said updating includes adding a missed call record to the list indicating a missed called from the calling party in response to detecting said missed called;
   detecting if at least one of the missed called list or the missed call record is accessed; and
   generating a notification intended for said calling party in response to detecting said access.

16. The method of claim 15, wherein the call initiated from the calling party to the called party is detected as missed if any one of the following occurs: the called party does not answer the call, the calling party is returned a busy signal, the device of the called party is switched off or the device of the called party is outside a coverage area in which service is provided to the device.

17. The method of claim 15, wherein the notification includes an indication of a time of the detected access which resulted in the notification being generated.

18. The method of claim 15, wherein the notification includes an indication of a time that the missed call record was added to the list of missed calls.

19. The method of claim 15, further comprising:
sending the notification directed to the calling party.

20. The method of claim 15, further comprising:
providing a prompt to confirm sending of the notification;
sending said notification directed to the calling party in response to detecting an affirmative response to said prompt; and
not sending said notification directed to the calling party in response to detecting a negative response to said prompt.

* * * * *